United States Patent
Bucknor et al.

(10) Patent No.: US 6,716,130 B1
(45) Date of Patent: Apr. 6, 2004

(54) FAMILY OF MULTI-SPEED TRANSMISSIONS WITH INTERCONNECTED PLANETARY GEARSETS AND A PLURALITY OF INPUT CLUTCHES

(75) Inventors: Norman Kenneth Bucknor, Troy, MI (US); Chi-Kuan Kao, Troy, MI (US); Madhusudan Raghavan, West Bloomfield, MI (US); Patrick Benedict Usoro, Troy, MI (US); Chunhao J. Lee, Troy, MI (US)

(73) Assignee: General Motors Corporation, Detroit, MI (US)

( * ) Notice: Subject to any disclaimer, the term of this patent is extended or adjusted under 35 U.S.C. 154(b) by 1 day.

(21) Appl. No.: 10/211,734

(22) Filed: Aug. 2, 2002

(51) Int. Cl.⁷ .................................................. F16H 3/66
(52) U.S. Cl. ........................................................ 475/275
(58) Field of Search ................................ 475/269, 275, 475/276, 296, 317, 323

(56) References Cited

U.S. PATENT DOCUMENTS

| | | | |
|---|---|---|---|
| 4,070,927 A | 1/1978 | Polak | 74/765 |
| 4,709,594 A | 12/1987 | Maeda | 74/753 |
| 5,106,352 A | 4/1992 | Lepelletier | 475/280 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,595,892 B2 * | 7/2003 | Raghavan et al. | 475/296 |
| 6,648,790 B2 * | 11/2003 | Raghavan et al. | 475/280 |
| 6,648,793 B1 * | 11/2003 | Kao et al. | 475/296 |
| 6,652,409 B2 * | 11/2003 | Kao et al. | 475/275 |
| 6,652,411 B2 * | 11/2003 | Kao et al. | 475/296 |

FOREIGN PATENT DOCUMENTS

JP 9-126283 5/1997

* cited by examiner

*Primary Examiner*—Ankur Parekh
(74) *Attorney, Agent, or Firm*—Kathryn A. Marra

(57) ABSTRACT

A family of power transmissions wherein each family member includes three planetary gearsets with three interconnecting members providing continuous interconnections between members of the planetary gearsets. The family members further include six selectively engageable torque-transmitting mechanisms, which are engaged in combinations of two to establish seven forward speed ratios and one reverse speed ratio between an input shaft and an output shaft of a transmission.

3 Claims, 17 Drawing Sheets

| | RATIOS | 50 | 52 | 54 | 56 | 58 | 60 |
|---|---|---|---|---|---|---|---|
| REVERSE | -2.92 | | | X | | X | |
| NEUTRAL | 0.00 | | | | | X | |
| 1 | 4.51 | | | | X | X | |
| 2 | 2.52 | | X | | | X | |
| 3 | 1.85 | | X | | X | | |
| 4 | 1.39 | | X | | | | X |
| 5 | 1.00 | X | X | | | | |
| 6 | 0.75 | X | | | | | X |
| 7 | 0.64 | X | | | X | | |

(X=engaged)

Ring Gear/Sun Gear Tooth Ratios: $\frac{R1}{S1}=1.52, \frac{R2}{S2}=2.92, \frac{R3}{S3}=1.54$

| Ratio Spread | 7.06 |
|---|---|
| Ratio Steps | |
| REV/1 | -0.65 |
| 1/2 | 1.79 |
| 2/3 | 1.36 |
| 3/4 | 1.33 |
| 4/5 | 1.39 |
| 5/6 | 1.34 |
| 6/7 | 1.17 |

| | RATIOS | 50 | 52 | 54 | 56 | 58 | 60 |
|---|---|---|---|---|---|---|---|
| REVERSE | -2.92 | | | X | | X | |
| NEUTRAL | 0.00 | | | | | X | |
| 1 | 4.51 | | | | X | X | |
| 2 | 2.52 | | X | | | X | |
| 3 | 1.85 | | X | | X | | |
| 4 | 1.39 | | X | | | | X |
| 5 | 1.00 | X | X | | | | |
| 6 | 0.75 | X | | | | | X |
| 7 | 0.64 | X | | | X | | |

( X=engaged)

Ring Gear/Sun Gear Tooth Ratios: $\frac{R1}{S1}=1.52, \frac{R2}{S2}=2.92, \frac{R3}{S3}=1.54$

| Ratio Spread | 7.06 |
|---|---|
| Ratio Steps | |
| REV/1 | -0.65 |
| 1/2 | 1.79 |
| 2/3 | 1.36 |
| 3/4 | 1.33 |
| 4/5 | 1.39 |
| 5/6 | 1.34 |
| 6/7 | 1.17 |

| | RATIOS | 150 | 152 | 154 | 156 | 158 | 160 |
|---|---|---|---|---|---|---|---|
| REVERSE | -2.55 | | | X | | X | |
| NEUTRAL | 0.00 | | | | | X | |
| 1 | 3.99 | | X | | | X | |
| 2 | 2.18 | | X | | | | X |
| 3 | 1.62 | | X | | X | | |
| 4 | 1.27 | | X | X | | | |
| 5 | 1.00 | X | X | | | | |
| 6 | 0.79 | X | | | X | | |
| 7 | 0.61 | X | | | | | X |

( X=engaged )

Ring Gear/Sun Gear Tooth Ratios: $\frac{R1}{S1}=2.99, \frac{R2}{S2}=1.53, \frac{R3}{S3}=1.51$

| Ratio Spread | 6.59 |
|---|---|
| Ratio Steps | |
| REV/1 | -0.64 |
| 1/2 | 1.83 |
| 2/3 | 1.35 |
| 3/4 | 1.27 |
| 4/5 | 1.27 |
| 5/6 | 1.26 |
| 6/7 | 1.31 |

| | RATIOS | 250 | 252 | 254 | 256 | 258 | 260 |
|---|---|---|---|---|---|---|---|
| REVERSE | -1.97 | | | X | X | | |
| NEUTRAL | 0.00 | | | X | | | |
| 1 | 4.36 | | | X | | X | |
| 2 | 2.52 | | X | | | X | |
| 3 | 1.93 | | X | X | | | |
| 4 | 1.47 | | X | | | | X |
| 5 | 1.00 | X | X | | | | |
| 6 | 0.69 | X | | | | | X |
| 7 | 0.59 | X | | X | | | |

( X=engaged )

Ring Gear/Sun Gear Tooth Ratios: $\frac{R1}{S1}=1.52, \frac{R2}{S2}=2.22, \frac{R3}{S3}=1.97$

| Ratio Spread | 7.33 |
|---|---|
| Ratio Steps | |
| REV/1 | -0.45 |
| 1/2 | 1.73 |
| 2/3 | 1.30 |
| 3/4 | 1.31 |
| 4/5 | 1.47 |
| 5/6 | 1.45 |
| 6/7 | 1.16 |

| | RATIOS | 350 | 352 | 354 | 356 | 358 | 360 |
|---|---|---|---|---|---|---|---|
| REVERSE | -8.36 | | | X | | X | |
| NEUTRAL | 0.00 | | | | | X | |
| 1 | 5.46 | | | | X | X | |
| 2 | 2.80 | X | | | | X | |
| 3 | 1.69 | X | | | X | | |
| 4 | 1.19 | X | | | | | X |
| 5 | 1.00 | X | X | | | | |
| 6 | 0.89 | | X | | | | X |
| 7 | 0.77 | | X | | X | | |

(X=engaged)

Ring Gear/Sun Gear Tooth Ratios: $\frac{R1}{S1}=1.80, \frac{R2}{S2}=2.99, \frac{R3}{S3}=1.53$

| Ratio Spread | 7.11 |
|---|---|
| Ratio Steps | |
| REV/1 | -1.53 |
| 1/2 | 1.95 |
| 2/3 | 1.66 |
| 3/4 | 1.42 |
| 4/5 | 1.19 |
| 5/6 | 1.12 |
| 6/7 | 1.16 |

| | RATIOS | 450 | 452 | 454 | 456 | 458 | 460 |
|---|---|---|---|---|---|---|---|
| REVERSE | -2.38 | | | X | | | X |
| NEUTRAL | 0.00 | | | | | | X |
| 1 | 5.33 | | | | X | | X |
| 2 | 3.67 | X | | | | | X |
| 3 | 2.77 | X | | | X | | |
| 4 | 1.79 | X | | | | X | |
| 5 | 1.00 | X | X | | | | |
| 6 | 0.70 | | X | | | X | |
| 7 | 0.62 | | X | X | | | |

(X=engaged)

Ring Gear/Sun Gear Tooth Ratios: $\frac{R1}{S1}=2.67, \frac{R2}{S2}=1.54, \frac{R3}{S3}=2.24$

| Ratio Spread | 8.57 |
|---|---|
| Ratio Steps | |
| REV/1 | -0.45 |
| 1/2 | 1.45 |
| 2/3 | 1.33 |
| 3/4 | 1.55 |
| 4/5 | 1.79 |
| 5/6 | 1.42 |
| 6/7 | 1.13 |

| | RATIOS | 550 | 552 | 554 | 556 | 558 | 560 |
|---|---|---|---|---|---|---|---|
| REVERSE | -2.24 | | | X | X | | |
| NEUTRAL | 0.00 | | | X | | | |
| 1 | 5.33 | | | X | | | X |
| 2 | 3.67 | X | | | | | X |
| 3 | 2.77 | X | | X | | | |
| 4 | 1.79 | X | | | | X | |
| 5 | 1.00 | X | X | | | | |
| 6 | 0.70 | | X | | | X | |
| 7 | 0.62 | | X | X | | | |

( X = engaged )

Ring Gear/Sun Gear Tooth Ratios: $\frac{R1}{S1}=2.67, \frac{R2}{S2}=1.54, \frac{R3}{S3}=2.24$

| Ratio Spread | 8.57 |
|---|---|
| Ratio Steps | |
| REV/1 | -0.42 |
| 1/2 | 1.45 |
| 2/3 | 1.33 |
| 3/4 | 1.55 |
| 4/5 | 1.79 |
| 5/6 | 1.42 |
| 6/7 | 1.13 |

| RATIOS | | 650 | 652 | 654 | 656 | 658 | 660 |
|---|---|---|---|---|---|---|---|
| REVERSE | -2.05 | | | X | | | X |
| NEUTRAL | 0.00 | | | | | | X |
| 1 | 3.99 | | X | | | | X |
| 2 | 2.18 | | X | | | X | |
| 3 | 1.42 | | X | | X | | |
| 4 | 1.16 | | X | X | | | |
| 5 | 1.00 | X | X | | | | |
| 6 | 0.86 | X | | | X | | |
| 7 | 0.61 | X | | | | X | |

(X=engaged)

Ring Gear/Sun Gear Tooth Ratios: $\frac{R1}{S1}=2.99, \frac{R2}{S2}=1.53, \frac{R3}{S3}=2.96$

| Ratio Spread | 6.59 |
|---|---|
| Ratio Steps | |
| REV/1 | -0.51 |
| 1/2 | 1.83 |
| 2/3 | 1.53 |
| 3/4 | 1.23 |
| 4/5 | 1.16 |
| 5/6 | 1.16 |
| 6/7 | 1.42 |

| | RATIOS | 750 | 752 | 754 | 756 | 758 | 760 |
|---|---|---|---|---|---|---|---|
| REVERSE | -2.92 | | | X | | | X |
| NEUTRAL | 0.00 | | | | | | X |
| 1 | 4.51 | | | | X | | X |
| 2 | 2.52 | | X | | | | X |
| 3 | 1.85 | | X | X | | | |
| 4 | 1.39 | | X | | | X | |
| 5 | 1.00 | X | X | | | | |
| 6 | 0.75 | X | | | | X | |
| 7 | 0.64 | X | | | X | | |

( X=engaged )

Ring Gear/Sun Gear Tooth Ratios: $\frac{R1}{S1}=1.52, \frac{R2}{S2}=2.92, \frac{R3}{S3}=1.54$

| Ratio Spread | 7.06 |
|---|---|
| Ratio Steps | |
| REV/1 | -0.65 |
| 1/2 | 1.79 |
| 2/3 | 1.36 |
| 3/4 | 1.33 |
| 4/5 | 1.39 |
| 5/6 | 1.34 |
| 6/7 | 1.17 |

|   | RATIOS | 850 | 852 | 854 | 856 | 858 | 860 |
|---|---|---|---|---|---|---|---|
| REVERSE | -1.97 |   |   | X | X |   |   |
| NEUTRAL | 0.00 |   |   | X |   |   |   |
| 1 | 4.36 |   |   | X |   |   | X |
| 2 | 2.52 |   | X |   |   |   | X |
| 3 | 1.93 |   | X | X |   |   |   |
| 4 | 1.47 |   | X |   |   | X |   |
| 5 | 1.00 | X | X |   |   |   |   |
| 6 | 0.69 | X |   |   |   | X |   |
| 7 | 0.59 | X |   | X |   |   |   |

( X = engaged )

Ring Gear/Sun Gear Tooth Ratios: $\frac{R1}{S1} = 1.52, \frac{R2}{S2} = 2.22, \frac{R3}{S3} = 1.97$

| Ratio Spread | 7.33 |
|---|---|
| Ratio Steps |   |
| REV/1 | -0.45 |
| 1/2 | 1.73 |
| 2/3 | 1.30 |
| 3/4 | 1.31 |
| 4/5 | 1.47 |
| 5/6 | 1.45 |
| 6/7 | 1.16 |

| RATIOS | | 950 | 952 | 954 | 956 | 958 | 960 |
|---|---|---|---|---|---|---|---|
| REVERSE | -8.45 | | | X | | | X |
| NEUTRAL | 0.00 | | | | | | X |
| 1 | 5.52 | | | | X | | X |
| 2 | 3.38 | X | | | | | X |
| 3 | 2.04 | X | | | X | | |
| 4 | 1.25 | X | | | | X | |
| 5 | 1.00 | X | X | | | | |
| 6 | 0.89 | | X | | | X | |
| 7 | 0.77 | | X | | X | | |

( X=engaged)

Ring Gear/Sun Gear Tooth Ratios: $\frac{R1}{S1}=2.38, \frac{R2}{S2}=2.50, \frac{R3}{S3}=1.53$

| Ratio Spread | 7.17 |
|---|---|
| Ratio Steps | |
| REV/1 | -1.53 |
| 1/2 | 1.63 |
| 2/3 | 1.66 |
| 3/4 | 1.63 |
| 4/5 | 1.25 |
| 5/6 | 1.12 |
| 6/7 | 1.16 |

| | RATIOS | 1050 | 1052 | 1054 | 1056 | 1058 | 1060 |
|---|---|---|---|---|---|---|---|
| REVERSE | -2.92 | | X | | X | | |
| NEUTRAL | 0.00 | | X | | | | |
| 1 | 3.08 | | X | | | | X |
| 2 | 1.53 | X | | | | | X |
| 3 | 1.00 | X | X | | | | |
| 4 | 0.75 | X | | | | X | |
| 5 | 0.60 | X | | X | | | |
| 6 | 0.51 | | | X | | X | |
| 7 | 0.44 | | X | X | | | |

(X=engaged)

Ring Gear/Sun Gear Tooth Ratios: $\frac{R1}{S1}=2.92, \frac{R2}{S2}=1.89, \frac{R3}{S3}=1.89$

| Ratio Spread | 7.00 |
|---|---|
| Ratio Steps | |
| REV/1 | -0.95 |
| 1/2 | 2.01 |
| 2/3 | 1.53 |
| 3/4 | 1.34 |
| 4/5 | 1.23 |
| 5/6 | 1.18 |
| 6/7 | 1.17 |

| | RATIOS | 1150 | 1152 | 1154 | 1156 | 1158 | 1160 |
|---|---|---|---|---|---|---|---|
| REVERSE | -2.38 | | | X | | X | |
| NEUTRAL | 0.00 | | | | | X | |
| 1 | 5.33 | | | | X | X | |
| 2 | 3.67 | X | | | | X | |
| 3 | 2.77 | X | | | X | | |
| 4 | 1.79 | X | | | | | X |
| 5 | 1.00 | X | X | | | | |
| 6 | 0.70 | | X | | | | X |
| 7 | 0.62 | | X | X | | | |

(X=engaged)

Ring Gear/Sun Gear Tooth Ratios: $\frac{R1}{S1}=2.67, \frac{R2}{S2}=1.54, \frac{R3}{S3}=2.24$

| Ratio Spread | 8.57 |
|---|---|
| Ratio Steps | |
| REV/1 | -0.45 |
| 1/2 | 1.45 |
| 2/3 | 1.33 |
| 3/4 | 1.55 |
| 4/5 | 1.79 |
| 5/6 | 1.42 |
| 6/7 | 1.13 |

| | RATIOS | 1250 | 1252 | 1254 | 1256 | 1258 | 1260 |
|---|---|---|---|---|---|---|---|
| REVERSE | -2.24 | | | X | X | | |
| NEUTRAL | 0.00 | | | X | | | |
| 1 | 5.33 | | | X | | X | |
| 2 | 3.67 | X | | | | X | |
| 3 | 2.77 | X | | X | | | |
| 4 | 1.79 | X | | | | | X |
| 5 | 1.00 | X | X | | | | |
| 6 | 0.70 | | X | | | | X |
| 7 | 0.62 | | X | X | | | |

( X =engaged)

Ring Gear/Sun Gear Tooth Ratios: $\frac{R1}{S1}=2.67, \frac{R2}{S2}=1.54, \frac{R3}{S3}=2.24$

| Ratio Spread | 8.57 |
|---|---|
| Ratio Steps | |
| REV/1 | -0.45 |
| 1/2 | 1.45 |
| 2/3 | 1.33 |
| 3/4 | 1.55 |
| 4/5 | 1.79 |
| 5/6 | 1.42 |
| 6/7 | 1.13 |

| | RATIOS | 1350 | 1352 | 1354 | 1356 | 1358 | 1360 |
|---|---|---|---|---|---|---|---|
| REVERSE | -2.53 | | X | | | X | |
| NEUTRAL | 0.00 | | | | | X | |
| 1 | 6.30 | | | X | | X | |
| 2 | 3.58 | | | X | | | X |
| 3 | 2.50 | | | X | X | | |
| 4 | 1.73 | | X | X | | | |
| 5 | 1.31 | X | | X | | | |
| 6 | 1.00 | X | X | | | | |
| 7 | 0.72 | X | | | | | X |

(X=engaged)

Ring Gear/Sun Gear Tooth Ratios: $\frac{R1}{S1}=2.53, \frac{R2}{S2}=1.52, \frac{R3}{S3}=1.50$

| Ratio Spread | 8.78 |
|---|---|
| Ratio Steps | |
| REV/1 | -0.40 |
| 1/2 | 1.76 |
| 2/3 | 1.43 |
| 3/4 | 1.45 |
| 4/5 | 1.31 |
| 5/6 | 1.31 |
| 6/7 | 1.39 |

| | RATIOS | 1450 | 1452 | 1454 | 1456 | 1458 | 1460 |
|---|---|---|---|---|---|---|---|
| REVERSE | -1.97 | | | X | X | | |
| NEUTRAL | 0.00 | | | X | | | |
| 1 | 4.55 | | | X | | X | |
| 2 | 2.54 | X | | | | X | |
| 3 | 1.92 | X | | X | | | |
| 4 | 1.47 | X | | | | | X |
| 5 | 1.00 | X | X | | | | |
| 6 | 0.70 | | X | | | | X |
| 7 | 0.61 | | X | X | | | |

( X=engaged )

Ring Gear/Sun Gear Tooth Ratios: $\frac{R1}{S1}=2.54, \frac{R2}{S2}=2.15, \frac{R3}{S3}=1.97$

| Ratio Spread | 7.52 |
|---|---|
| Ratio Steps | |
| REV/1 | -0.43 |
| 1/2 | 1.79 |
| 2/3 | 1.32 |
| 3/4 | 1.31 |
| 4/5 | 1.47 |
| 5/6 | 1.43 |
| 6/7 | 1.15 |

|  | RATIOS | 1550 | 1552 | 1554 | 1556 | 1558 | 1560 |
|---|---|---|---|---|---|---|---|
| REVERSE | -3.11 |  | X |  | X |  |  |
| NEUTRAL | 0.00 |  | X |  |  |  |  |
| 1 | 2.91 |  | X |  |  |  | X |
| 2 | 1.60 | X |  |  |  |  | X |
| 3 | 1.00 | X |  | X |  |  |  |
| 4 | 0.69 | X |  |  |  | X |  |
| 5 | 0.55 | X |  | X |  |  |  |
| 6 | 0.48 |  |  | X |  | X |  |
| 7 | 0.41 |  | X | X |  |  |  |

(X=engaged)

Ring Gear/Sun Gear Tooth Ratios: $\frac{R1}{S1} = 2.22$, $\frac{R2}{S2} = 1.68$, $\frac{R3}{S3} = 2.15$

| Ratio Spread | 7.03 |
|---|---|
| Ratio Steps |  |
| REV/1 | -1.07 |
| 1/2 | 1.83 |
| 2/3 | 1.60 |
| 3/4 | 1.45 |
| 4/5 | 1.24 |
| 5/6 | 1.15 |
| 6/7 | 1.17 |

| | RATIOS | 1650 | 1652 | 1654 | 1656 | 1658 | 1660 |
|---|---|---|---|---|---|---|---|
| REVERSE | -2.50 | | X | | | | X |
| NEUTRAL | 0.00 | | X | | | | |
| 1 | 5.50 | | X | | | X | |
| 2 | 2.28 | X | | | | X | |
| 3 | 1.37 | | | X | | X | |
| 4 | 1.00 | | | X | X | | |
| 5 | 0.71 | | | X | | X | |
| 6 | 0.66 | X | | | | X | |
| 7 | 0.52 | | | | | X | X |

(X=engaged)

Ring Gear/Sun Gear Tooth Ratios: $\frac{R1}{S1} = 2.50, \frac{R2}{S2} = 2.47, \frac{R3}{S3} = 2.70$

| Ratio Spread | 10.58 |
|---|---|
| Ratio Steps | |
| REV/1 | -0.45 |
| 1/2 | 2.41 |
| 2/3 | 1.67 |
| 3/4 | 1.37 |
| 4/5 | 1.40 |
| 5/6 | 1.08 |
| 6/7 | 1.27 |

FAMILY OF MULTI-SPEED TRANSMISSIONS WITH INTERCONNECTED PLANETARY GEARSETS AND A PLURALITY OF INPUT CLUTCHES

TECHNICAL FIELD

This invention relates to planetary type power transmissions and, more particularly, to such transmissions providing at least seven forward speed ratios and one reverse speed ratio.

BACKGROUND OF THE INVENTION

Automatic shifting power transmissions are currently used in a majority of the vehicles produced in the United States. These vehicles generally employ three- and four-speed power transmissions. More recently, a trend towards more ratios, such as five- and six-speed power transmissions, has been proposed. In fact, some manufacturers do provide five-speed transmissions. Many of the vehicles utilizing manual type transmissions or countershaft type transmissions employ five- and six-speed power transmissions.

The five- and six-speed power transmissions provide improved vehicle acceleration performance and fuel economy when compared with three- and four- speed transmissions. Seven-speed transmissions offer further vehicle acceleration performance and fuel economy improvement over five- and six-speed transmissions. However, seven-speed power transmissions have not been proposed due to the complexity of these assemblies, as well as size and cost. There are many current patents that describe five- and six-speed power transmissions. Some of the six-speed power transmission patents, especially those assigned to the assignee of the present invention, describe six-speed power transmissions in families, wherein one or more family members incorporate a seven-speed power transmission. However, many of these seven-speed transmissions do not offer attractive ratio progressions.

SUMMARY OF THE INVENTION

It is an object of the present invention to provide an improved family of multi-speed planetary transmissions.

In one aspect of the present invention, each family member has three planetary gearsets each of which has a first, a second, and a third planetary member.

In another aspect of the present invention, a first member of the first planetary gearset and a first member of the second planetary gearset are continuously interconnected by a first interconnecting member.

In yet another aspect of the present invention, a second member of the first planetary gearset and a second member of the second planetary gearset are continuously interconnected by a second interconnecting member.

In still another aspect of the present invention, a third member of the second planetary gearset is continuously interconnected with a first member of the third planetary gearset.

In yet still another aspect of the present invention, a second member of the third planetary gearset is continuously interconnected with a stationary housing member such as the transmission case.

In a further aspect of the present invention, a transmission output shaft is continuously connected with at least one member of one of the planetary gearsets; and a transmission input shaft, which only interconnects selectively with members of the planetary gearsets.

In a still further aspect of the present invention, a first, second, and third torque-transmitting mechanism selectively interconnect the input shaft with at least one member of one of the planetary gearsets or with one of the interconnecting members. In a yet still further aspect of the present invention, a fourth torque-transmitting mechanism selectively interconnects a member of one of the planetary gearsets or one of the interconnecting members with either the input shaft, the output shaft, another member of one of the planetary gearsets, or with the transmission housing.

In yet a further aspect of the present invention, a fifth torque-transmitting mechanism selectively interconnects a member of one of the planetary gearsets with the output shaft, another member of one of the planetary gearsets, or with the stationary housing.

In a yet still further aspect of the present invention, a sixth torque-transmitting mechanism selectively interconnects a member of one of the planetary gearsets with a stationary housing of the transmission.

In a still further aspect of the present invention, the six torque-transmitting mechanisms are selectively engageable in combinations of two to establish at least seven forward speed ratios and one reverse speed ratio between the input shaft and the output shaft through the planetary gearsets.

DESCRIPTION OF THE EXEMPLARY EMBODIMENTS

Figures 1, 2:
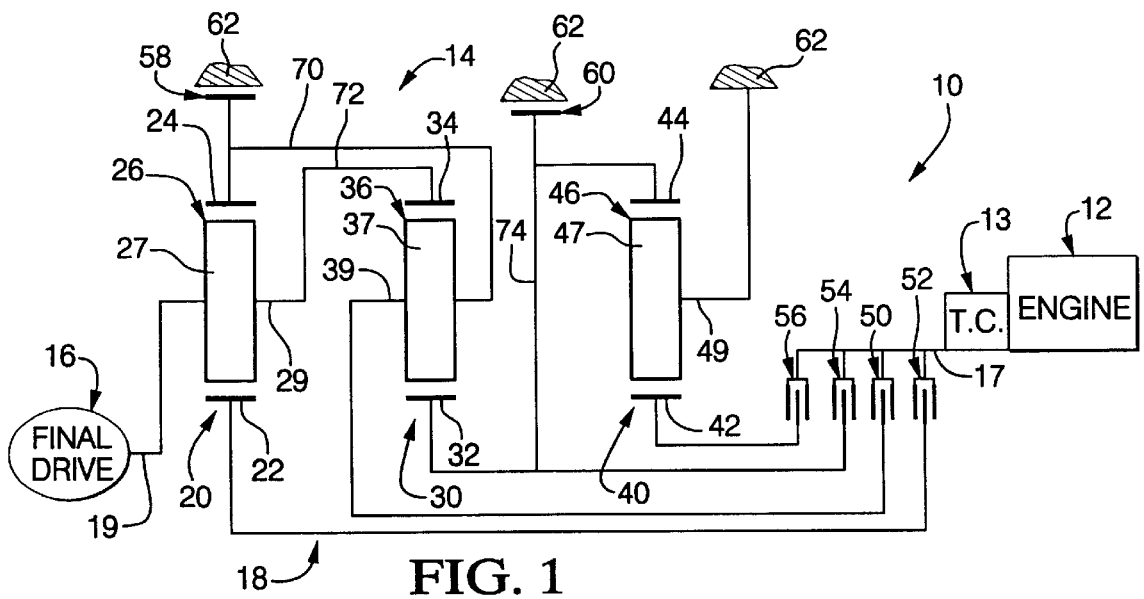
FIG. 1 is a schematic representation of a powertrain having a family transmission member incorporating the present invention.
FIG. 2 is a truth table and chart depicting some of the operating parameters for the transmission shown in FIG. 1.

Referring to the drawings, wherein like characters represent the same or corresponding parts throughout the several views, there is seen in FIG. 1 a powertrain 10, having a conventional engine 12, a conventional torque converter 13, a planetary transmission 14, and a final drive mechanism 16. The final drive mechanism 16 is drivingly connected with vehicle drive wheels, not shown.

The planetary transmission 14 includes an input shaft 17, a planetary gear arrangement 18, and an output shaft 19. The input shaft 17 is continuously connected with the torque converter 13 and the output shaft 19 is continuously connected with the final drive mechanism 16. However, with the present invention providing seven forward speeds, there is generally a large enough ratio spread to permit sufficient starting torque without the use of a torque converter and a more conventional starting type device can be utilized between the engine 12 and the input shaft 17, also many of the torque-transmitting mechanisms of the transmission can be utilized as a starting device.

The planetary gear arrangement 18 includes three planetary gearsets 20, 30, and 40 and six torque-transmitting mechanisms 50, 52, 54, 56, 58, and 60. The torque-transmitting mechanisms 50, 52, 54, and 56 are conventional rotating type torque-transmitting mechanisms, which are essentially fluid-operated clutches, the structure of which is well known by those skilled in the art. The torque-transmitting mechanisms 58 and 60 are stationary type torque-transmitting mechanisms, commonly termed brakes. These torque-transmitting mechanisms 58 and 60 may take the form of either a disc type fluid-operated type brake member or a band type fluid-operated member.

The planetary gearset 20 includes a sun gear member 22, a ring gear member 24, and a planet carrier assembly member 26. The planet carrier assembly member 26 includes a plurality of pinion gears 27 rotatably mounted on a planet carrier member 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 includes a plurality of pinion gears 37 rotatably mounted on a planet carrier member 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 rotatably mounted on a planet carrier member 49 and disposed in meshing relationship with both the sun gear member 42 and the ring gear member 44.

Each of the planetary gearsets 20, 30, and 40 depict a single pinion gear member, however, as is well known in the art, the planet carrier assembly members include a plurality of pinion gears equally spaced on the respective carrier 29, 39, and 49 to provide for equal distribution of torque through the planetary gearsets.

The ring gear member 24 and the planet carrier assembly member 36 are continuously interconnected by interconnecting member 70. The ring gear member 34, the planet carrier assembly member 26, and output shaft 19 are continuously interconnected by an interconnecting member 72. The sun gear member 32 and ring gear member 44 are continuously interconnected by an interconnecting member 74.

The input shaft 17 is selectively connectible with the interconnecting member 70 through the torque-transmitting mechanism 50, selectively connectible with the sun gear member 22 through the torque-transmitting mechanism 52, selectively connectible with the interconnecting member 74 through the torque-transmitting mechanism 54, and selectively connectible with the sun gear member 42 through the torque-transmitting mechanism 56. The planet carrier assembly member 46 is continuously connected with a stationary portion of the transmission, such as a transmission housing 62. The interconnecting member 70 is selectively connectible with the transmission housing 62 through the torque-transmitting mechanism 58. The interconnecting member 74 is selectively connectible with the transmission housing 62 through the torque-transmitting mechanism 60.

The truth table of FIG. 2 describes the engagement sequence and combination for the torque-transmitting mechanisms in order to establish seven forward speed ratios and one reverse speed ratio between the input shaft 17 and the output shaft 19 through the planetary gear arrangement 18. Also provided in the truth table is a numerical example of the speed ratios that are available with the planetary gear arrangement 18 when the planetary gearsets 20, 30, and 40 have ring gear/sun gear tooth ratios shown as R1/S1, R2/S2, and R3/S3, respectively. The chart of FIG. 2 describes the numerical value for the ratio steps between adjacent forward speed ratios when the numerical values given in the truth table are employed. The chart of FIG. 2 also provides the ratio step for the reverse to the first forward speed ratio and also the overall ratio spread of the forward speed ratios.

The reverse speed ratio is established with the engagement of the torque-transmitting mechanisms 54 and 58. During the reverse speed ratio, the sun gear member 32 is rotated at the speed of the input shaft 17. The ring gear member 34 and therefore output shaft 19 are rotated at a speed determined by the speed of the sun gear member 32 and the ring gear/sun gear tooth ratio of the planetary gearset 30. The numerical value of the reverse speed ratio is determined by the ring gear/sun gear tooth ratio of the planetary gearset 30.

The first forward speed ratio is established with the engagement of the torque-transmitting mechanisms 56 and 58. It can be noted that the reverse to first ratio interchange is accomplished with the mere swapping of the torque-transmitting mechanisms 54 and 56. The torque-transmitting mechanism 58 can remain engaged through a neutral condition. During the first forward speed ratio, the ring gear member 44 and sun gear member 32 are rotated at a speed determined by the speed of the sun gear member 42 and the ring gear/sun gear tooth ratio of the planetary gearset 40. The ring gear member 34 and therefore output shaft 19 are rotated at a speed determined by the speed of the sun gear member 32 and the ring gear/sun gear tooth ratio of the planetary gearset 30. The numerical value of the first forward speed ratio is determined by the ring gear/sun gear tooth ratios of the planetary gearsets 30 and 40.

The second forward speed ratio is established with the engagement of the torque-transmitting mechanisms 52 and 58. It can be noted that the 1–2 interchange is a single transition shift. During the second forward speed ratio, the planet carrier assembly member 26 and therefore output shaft 19 are rotated at a speed determined by the speed of the sun gear member 22 and the ring gear/sun gear tooth ratio of the planetary gearset 20. The numerical value of the second forward speed ratio is determined by the ring gear/sun gear tooth ratio of the planetary gearset 20.

The third forward speed ratio is established with the engagement of the torque-transmitting mechanisms 52 and 56. This ratio interchange is also a single transition shift. During the third forward speed ratio, the ring gear member 44 and sun gear member 32 are rotated at a speed determined by the speed of the sun gear member 42 and the ring gear/sun gear tooth ratio of the planetary gearset 40. The planet carrier assembly member 36 and ring gear member 24 are rotated at a speed determined by the speed of the sun gear member 32 and the ring gear/sun gear tooth ratio of the planetary gearset 30. The planet carrier assembly member 26 and ring gear member 34 and therefore output shaft 19 are rotated at a speed determined by the speed of the ring gear member 24, the speed of the sun gear member 22, and the ring gear/sun gear tooth ratio of the planetary gearset 20. The numerical value of the third forward speed ratio is determined by the ring gear/sun gear tooth ratios of all three planetary gearsets 20, 30, and 40.

The fourth forward speed ratio is established with the engagement of the torque-transmitting mechanisms 52 and 60. This interchange is also a single transition shift. During the fourth forward speed ratio, the ring gear member 24 and planet carrier assembly member 36 are rotated at a speed determined by the speed of the sun gear member 22, the speed of the planet carrier assembly member 26, and the ring gear/sun gear tooth ratio of the planetary gearset 20. The ring gear member 34 and planet carrier assembly member 26 and therefore output shaft 19 are rotated at a speed determined by the speed of the planet carrier assembly member 36 and the ring gear/sun gear tooth ratio of the planetary gearset 30. The numerical value of the fourth forward speed ratio is determined by the ring gear/sun gear tooth ratios of the planetary gearsets 20 and 30.

The fifth forward speed ratio is established with the engagement of the torque-transmitting mechanisms 50 and 52. This is also a single transition interchange. During the fifth forward speed ratio, the planetary gearsets 20 and 30 rotate as a unit such that the output shaft 19 rotates in unison with the input shaft 17. The numerical value of the fifth forward speed ratio is one.

The sixth forward speed ratio is established with the engagement of the torque-transmitting mechanisms 50 and 60. This also is a single transition interchange from fifth. During the sixth forward speed ratio, the ring gear member 34 and therefore output shaft 19 are rotated at a speed determined by the speed of the planet carrier assembly member 36 and the ring gear/sun gear tooth ratio of the planetary gearset 30. The numerical value of the sixth forward speed ratio is determined by the ring gear/sun gear tooth ratio of the planetary gearset 30.

The seventh forward speed ratio is established with the engagement of the torque-transmitting mechanisms 50 and 56. The interchange from sixth to seventh and vice versa is also a single transition interchange. During the seventh forward speed ratio, the ring gear member 44 and sun gear member 32 are rotated at a speed determined by the speed of the sun gear member 42 and the ring gear/sun gear tooth ratio of the planetary gearset 40. The ring gear member 34 and therefore output shaft 19 are rotated at a speed determined by the speed of the sun gear member 32, the speed of the planet carrier assembly member 36, and the ring gear/sun gear tooth ratio of the planetary gearset 30. The numerical value of the seventh forward speed ratio is determined by the ring gear/sun gear tooth ratios of the planetary gearsets 30 and 40.

Figures 3, 4:
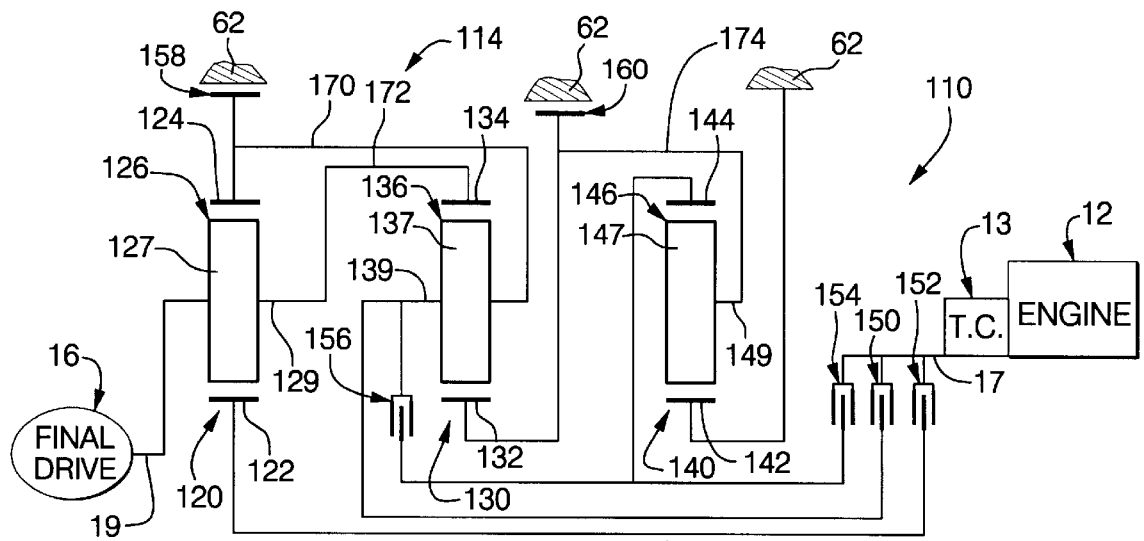
FIG. 3 is a schematic representation of a powertrain having another family transmission member of the present invention incorporated therein.
FIG. 4 is a truth table and chart depicting some of the operating parameters of the transmission shown in FIG. 3.

A powertrain 110, shown in FIG. 3, includes the engine 12, the torque converter 13, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140 and six torque-transmitting mechanisms 150, 152, 154, 156, 158, and 160. The torque-transmitting mechanisms 158 and 160 are stationary type torque-transmitting mechanisms while the remaining torque-transmitting mechanisms are of the rotating type torque-transmitting mechanisms.

The planetary gearset 120 includes a sun gear member 122, a ring gear member 124, and a planet carrier assembly member 126. The planet carrier assembly member 126 includes a plurality of pinion gears 127 rotatably mounted on a planet carrier member 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on a planet carrier member 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier member 149 and disposed in meshing relationship with both the sun gear member 142 and the ring gear member 144.

The ring gear member 124 is continuously interconnected with the planet carrier assembly member 136 through an interconnecting member 170, which is selectively connectible with the input shaft 17 through the torque-transmitting mechanism 150 and selectively connectable with the housing 62 through the torque transmitting mechanism 158. The ring gear member 134, the planet carrier assembly member 126, and the output shaft 19 are continuously interconnected by an interconnecting member 172.

The planet carrier assembly member 146 and the sun gear member 132 are continuously interconnected by an interconnecting member 174 which is selectively connectible with the transmission housing 62 through the torque-transmitting mechanism 160. The sun gear member 142 is continuously connected with the transmission housing 62. The sun gear member 122 is selectively connectible with the input shaft 17 through the torque-transmitting mechanism 152. The ring gear member 144 is selectively connectible with the input shaft 17 through the torque-transmitting mechanism 154 and selectively connectible with the interconnecting member 170 through the torque-transmitting mechanism 156.

The truth table and chart of FIG. 4 describe the engagement sequence and combinations of the torque-transmitting mechanisms in order to establish seven forward speed ratios and one reverse speed ratio between the input shaft 17 and the output shaft 19 through the planetary gear arrangement 118. The truth table also provides a numerical example for the speed ratios of the planetary gear arrangement 118 when the ring gear/sun gear tooth ratios of the planetary gearsets 120, 130, and 140 are as shown in R1/S1, R2/S2, and R3/S3, respectively. The chart of FIG. 4 shows the numerical value of the ratio steps between adjacent forward speed ratios as well as between the reverse and first forward speed ratio when the speed ratios given in the truth table are employed. Also shown in FIG. 4 is the overall ratio spread of the forward speed ratios.

To establish the reverse speed ratio, the torque-transmitting mechanisms 154 and 158 are engaged. During the reverse speed ratio, the planet carrier assembly member 146 and sun gear member 132 are rotated at a speed determined by the speed of the ring gear member 144 and the ring gear/sun gear tooth ratio of the planetary gearset 140. The ring gear member 134 and therefore output shaft 19 are rotated at a speed determined by the speed of the sun gear member 132 and the ring gear/sun gear tooth ratio of the planetary gearset 130. The numerical value of the reverse speed ratio is determined by the ring gear/sun gear tooth ratios of the planetary gearsets 130 and 140.

The first forward speed ratio is established with the engagement of the torque-transmitting mechanisms 152 and 158. During the first forward speed ratio, the planet carrier assembly member 126 and therefore output shaft 19 are rotated at a speed determined by the speed of the sun gear member 122 and the ring gear/sun gear tooth ratio of the planetary gearset 120. The numerical value of the first forward speed ratio is determined by the ring gear/sun gear tooth ratio of the planetary gearset 120.

The second forward speed ratio is established with the engagement of the torque-transmitting mechanisms 152 and 160. During the second forward speed ratio, the ring gear member 124 and planet carrier assembly member 136 are rotated at a speed determined by the speed of the sun gear member 122, the speed of the planet carrier assembly member 126, and the ring gear/sun gear tooth ratio of the planetary gearset 120. The ring gear member 134, planet carrier assembly member 126 and therefore output shaft 19 are rotated at a speed determined by the speed of the planet carrier assembly member 136 and the ring gear/sun gear tooth ratio of the planetary gearset 130. The numerical value of the second forward speed ratio is determined by the ring gear/sun gear tooth ratios of the planetary gearsets 120 and 130.

The third forward speed ratio is established with the engagement of the torque-transmitting mechanisms 152 and 156. During the third forward speed ratio, the ring gear member 124, planet carrier assembly member 136, and ring gear member 144 are rotated at a speed determined by the speed of the sun gear member 122, the speed of the planet carrier assembly member 126, and the ring gear/sun gear tooth ratio of the planetary gearset 120. The planet carrier assembly member 146 and sun gear member 132 are rotated at a speed determined by the speed of the ring gear member 144 and the ring gear/sun gear tooth ratio of the planetary gearset 140. The ring gear member 134, planet carrier assembly member 126, and output shaft 19 are rotated at a speed determined by the speed of the sun gear member 132, the speed of the planet carrier assembly member 136, and the ring gear/sun gear tooth ratio of the planetary gearset 130. The numerical value of the third forward speed ratio is determined by the ring gear/sun gear tooth ratios of all three planetary gearsets 120, 130, and 140.

The fourth forward speed ratio is established with the engagement of the torque-transmitting mechanisms 152 and 154. During the fourth forward speed ratio, the planet carrier assembly member 146 and sun gear member 132 are rotated at a speed determined by the speed of the ring gear member 144 and the ring gear/sun gear tooth ratio of the planetary gearset 140. The ring gear member 124 and planet carrier assembly member 136 are rotated at a speed determined by the speed of the of the sun gear member 122, the speed of the planet carrier assembly member 126, and the ring gear/sun gear tooth ratio of the planetary gearset 120. The ring gear member 134, planet carrier assembly member 126, and output shaft 19 are rotated at a speed determined by the speed of the sun gear member 132, the speed of the planet carrier assembly member 136, and the ring gear/sun gear tooth ratio of the planetary gearset 130. The numerical value of the fourth forward speed ratio is determined by the ring gear/sun gear tooth ratios of all three planetary gearsets 120, 130, and 140.

The fifth forward speed ratio is established with the engagement of the torque-transmitting mechanisms 150 and 152. During the fifth forward speed ratio, the planetary gearsets 120 and 130 are rotated as a single unit along with the output shaft 19. The input shaft 17 and output shaft 19 rotate at the same speed. Therefore, the numerical value of the fifth forward speed ratio is one.

The sixth forward speed ratio is established with the engagement of the torque-transmitting mechanisms 150 and 154. During the sixth forward speed ratio, the planet carrier assembly member 146 and sun gear member 132 are rotated at a speed determined by the speed of the ring gear member 144 and the ring gear/sun gear tooth ratio of the planetary gearset 140. The ring gear member 134 and therefore output shaft 19 are rotated at a speed determined by the speed of the sun gear member 132, the speed of the planet carrier assembly member 136, and the ring gear/sun gear tooth ratio of the planetary gearset 130. The numerical value of the sixth forward speed ratio is determined by the ring gear/sun gear tooth ratios of the planetary gearsets 130 and 140.

The seventh forward speed ratio is established with the engagement of the torque-transmitting mechanisms 150 and 160. During the seventh forward speed ratio, the ring gear member 134 and therefore output shaft 19 are rotated at a speed determined by the speed of the planet carrier assembly member 136 and the ring gear/sun gear tooth ratio of the planetary gearset 130. The numerical value of the seventh forward speed ratio is determined by the ring gear/sun gear tooth ratio of the planetary gearset 130.

Figures 5, 6:
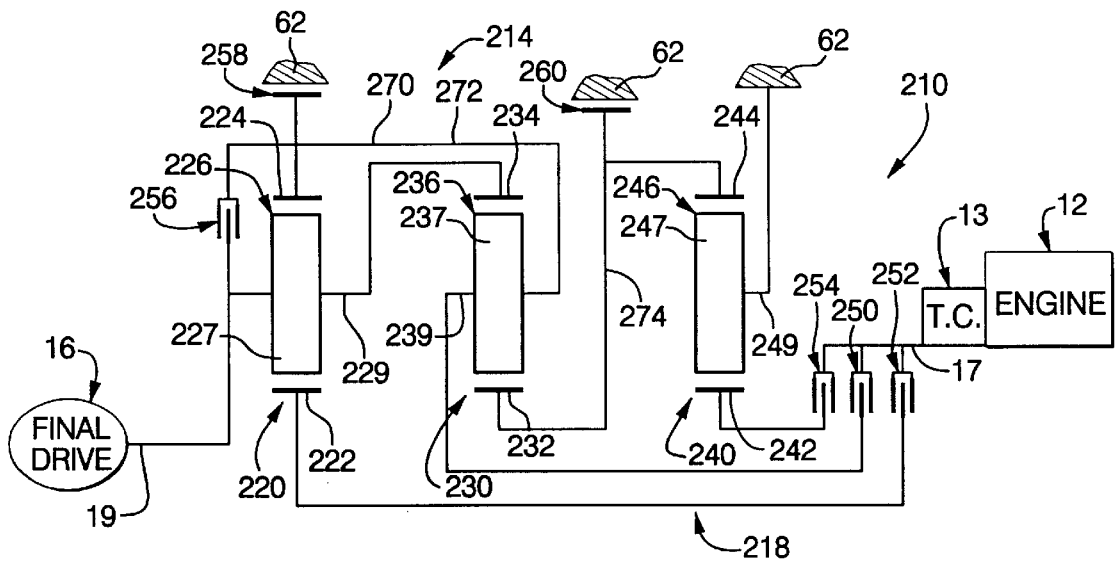
FIG. 5 is a schematic representation of a powertrain having another family transmission member of the present invention incorporated therein.
FIG. 6 is a truth table and chart depicting some of the operating parameters of the transmission shown in FIG. 5.

A powertrain 210, shown in FIG. 5, includes the engine 12, the torque converter 13, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240 and six torque-transmitting mechanisms 250, 252, 254, 256, 258, and 260. The torque-transmitting mechanisms 258 and 260 are stationary type torque-transmitting mechanisms while the remaining torque-transmitting mechanisms are of the rotating type torque-transmitting mechanisms.

The planetary gearset 220 includes a sun gear member 222, a ring gear member 224, and a planet carrier assembly member 226. The planet carrier assembly member 226 includes a plurality of pinion gears 227 rotatably mounted on a planet carrier member 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on a planet carrier member 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier member 249 and disposed in meshing relationship with both the sun gear member 242 and the ring gear member 244.

The ring gear member 224 and planet carrier assembly member 236 are continuously interconnected by an interconnecting member 270, which is selectively connectible with the output shaft 19. The planet carrier assembly member 226 and ring gear member 234 are continuously interconnected through an interconnecting member 272, which is continuously connected with the output shaft 19. The sun gear member 232 and ring gear member 244 are continuously interconnected by an interconnecting member 274, which is selectively connectible with the transmission housing 62 through the torque-transmitting mechanism 260. The planet carrier assembly member 246 is continuously connected with the transmission housing 62.

The input shaft 17 is selectively connectible with the interconnecting member 270 through the torque-transmitting mechanism 250, selectively connectible with the sun gear member 222 through the torque-transmitting mechanism 252, and selectively interconnectible with the sun gear member 242 through the torque-transmitting mechanism 254. The interconnecting member 270 is selectively connectible with the transmission housing 62 through the torque-transmitting mechanism 258 and selectively connectable with the output shaft 19 through the torque transmitting mechanism 256.

The truth table, shown in FIG. 6, describes the engagement combinations and sequence for the torque-transmitting mechanisms in order to establish seven forward speed ratios and one reverse speed ratio through the planetary gear arrangement 218 between the input shaft 17 and the output shaft 19. The truth table also provides a numerical example for possible speed ratios for the planetary gear arrangement 218. The speed ratios are arrived at by using the ring gear/sun gear tooth ratios of the planetary gearsets 220, 230, and 240 represented by R1/S1, R2/S2, and R3/S3, respectively. Also shown in FIG. 6 is a chart providing numerical values for the ratio steps between adjacent forward speed ratios as well as between the reverse and first forward speed ratio. The chart of FIG. 6 also provides the overall ratio spread for the forward speed ratios.

The reverse speed ratio is established with the engagement of the torque-transmitting mechanisms 254 and 256. During the reverse speed ratio, the ring gear member 244 and the planetary gearsets 220 and 230, as well as output shaft 19, are rotated at a speed determined by the speed of the sun gear member 242 and the ring gear/sun gear tooth ratio of the planetary gearset 240. The numerical value of the reverse speed ratio is determined by the ring gear/sun gear tooth ratio of the planetary gearset 240.

The first forward speed ratio is established with the engagement of the torque-transmitting mechanisms 254 and 258. During the first forward speed ratio, the ring gear member 244 and sun gear member 232 are rotated at a speed determined by the speed of the sun gear member 242 and the ring gear/sun gear tooth ratio of the planetary gearset 240. The ring gear member 234 and therefore output shaft 19 are rotated at a speed determined by the speed of the sun gear member 232 and the ring gear/sun gear tooth ratio of the planetary gearset 230. The numerical value of the first forward speed ratio is determined by the ring gear/sun gear tooth ratios of the planetary gearsets 230 and 240.

The second forward speed ratio is established with the engagement of the torque-transmitting mechanisms 252 and 258. During the second forward speed ratio, the planet carrier assembly member 226 and therefore output shaft 19 are rotated at a speed determined by the speed of the sun gear member 222 and the ring gear/sun gear tooth ratio of the planetary gearset 220. The numerical value of the second forward speed ratio is determined by the ring gear/sun gear tooth ratio of the planetary gearset 220.

The third forward speed ratio is established with the engagement of the torque-transmitting mechanisms 252 and 254. During the third forward speed ratio, the ring gear member 244 and sun gear member 232 are rotated at a speed determined by the speed of the sun gear member 242 and the ring gear/sun gear tooth ratio of the planetary gearset 240. The planet carrier assembly member 236 and ring gear member 224 are rotated at a speed determined by the speed of the of the sun gear member 232, the speed of the ring gear member 234, and the ring gear/sun gear tooth ratio of the planetary gearset 230. The planet carrier assembly member 226, ring gear member 234, and output shaft 19 are rotated at a speed determined by the speed of the sun gear member 222, the speed of the ring gear member 224, and the ring gear/sun gear tooth ratio of the planetary gearset 220. The numerical value of the third forward speed ratio is determined by the ring gear/sun gear tooth ratios of all three planetary gearsets 220, 230, and 240.

The fourth forward speed ratio is established with the engagement of the torque-transmitting mechanisms 252 and 260. During the fourth forward speed ratio, the ring gear member 222 and planet carrier assembly member 236 are rotated at a speed determined by the speed of the sun gear member 222, the speed of the planet carrier assembly member 226, and the ring gear/sun gear tooth ratio of the planetary gearset 220. The ring gear member 234, planet carrier assembly member 226, and the output shaft 19 are rotated at a speed determined by the speed of the planet carrier assembly member 236 and the ring gear/sun gear tooth ratio of the planetary gearset 230. The numerical value of the fourth forward speed ratio is determined by the ring gear/sun gear tooth ratios of the planetary gearsets 220 and 230.

The fifth forward speed ratio is established with the engagement of the torque-transmitting mechanisms 250 and 252. During the fifth forward speed ratio, the planetary gearset 220 and therefore output shaft 19 are rotated in unison with the input shaft 17. The numerical value of the fifth forward speed ratio is one.

The sixth forward speed ratio is established with the engagement of the torque-transmitting mechanisms 250 and 260. During the sixth forward speed ratio, the ring gear member 234, planet carrier assembly member 226 and therefore output shaft 19 are rotated at a speed determined by the speed of the planet carrier assembly member 236 and the ring gear/sun gear tooth ratio of the planetary gearset 230. The numerical value of the sixth forward speed ratio is determined by the ring gear/sun gear tooth ratio of the planetary gearset 230.

The seventh forward speed ratio is established with the engagement of the torque-transmitting mechanisms 250 and 254. During the seventh forward speed ratio, the ring gear member 244 and sun gear member 232 are rotated at a speed determined by the speed of the sun gear member 242 and the ring gear/sun gear tooth ratio of the planetary gearset 240. The ring gear member 234 and therefore output shaft 19 are rotated at a speed determined by the speed of the planet carrier assembly member 236, the speed of the sun gear member 232, and the ring gear/sun gear tooth ratio of the planetary gearset 230. The numerical value of the seventh forward speed ratio is determined by the ring gear/sun gear tooth ratios of the planetary gearsets 230 and 240.

Figures 7, 8:
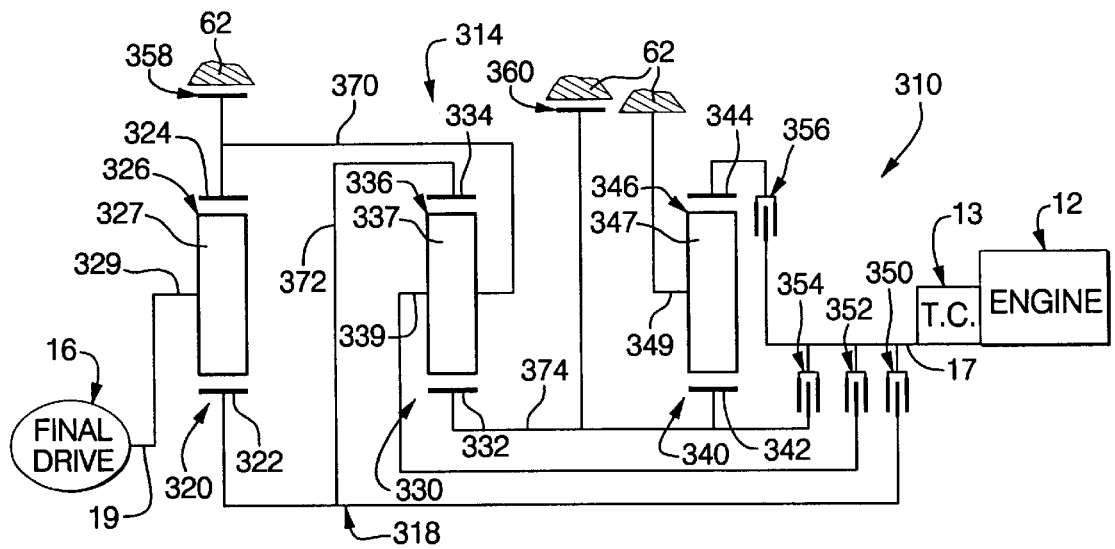
FIG. 7 is a schematic representation of a powertrain having another family transmission member of the present invention incorporated therein.
FIG. 8 is a truth table and chart depicting some of the operating parameters of the transmission shown in FIG. 7.

A powertrain 310, shown in FIG. 7, includes the engine 12, the torque converter 13, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340 and six torque-transmitting mechanisms 350, 352, 354, 356, 358, and 360. The torque-transmitting mechanisms 358 and 360 are stationary type torque-transmitting mechanisms while the remaining torque-transmitting mechanisms are of the rotating type torque-transmitting mechanisms.

The planetary gearset 320 includes a sun gear member 322, a ring gear member 324, and a planet carrier assembly member 326. The planet carrier assembly member 326 includes a plurality of pinion gears 327 rotatably mounted on a planet carrier member 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on a planet carrier member 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier member 349 and disposed in meshing relationship with both the sun gear member 342 and the ring gear member 344.

The ring gear member 324 and planet carrier assembly member 336 are continuously interconnected by an interconnecting member 370, which is selectively connectible with the input shaft 17 through the torque-transmitting mechanism 352 and selectively connectible with the transmission housing 62 through the torque-transmitting mechanism 358. The sun gear member 322 and ring gear member 334 are continuously interconnected through an interconnecting member 372, which is selectively connectible with the input shaft 17 through the torque-transmitting mechanism 350. The sun gear members 332 and 342 are continuously interconnected by an interconnecting member 374, which is selectively connectible with the input shaft 17 through the torque-transmitting mechanism 354 and selectively connectible with the transmission housing 62 through the torque-transmitting mechanism 360. The planet carrier assembly member 346 is continuously connectible with the transmission housing 62. The ring gear member 344 is selectively connectible with the input shaft 17 through the torque-transmitting mechanism 356. The planet carrier assembly member 326 is continuously connected with the output shaft 19.

The truth table of FIG. 8 describes the engagement combinations and sequence for the torque-transmitting mechanisms in order to provide seven forward speed ratios and one reverse speed ratio between the input shaft 17 and the output shaft 19 through the planetary gear arrangement 318. The truth table also gives an example of numerical values for the seven forward speed ratios and the reverse speed ratio. These numerical values are determined by the ring gear/sun gear tooth ratios of the planetary gearsets 320, 330, and 340 when they are equal to the ratios represented as R1/S1, R2/S2, and R3/S3, respectively. Also given in FIG. 8 is a chart, which provides the numerical values for the ratio steps between adjacent forward speed ratios as well as between the reverse and first forward speed ratio. Another numerical value given in the chart is the overall ratio spread of the forward speed ratios.

The reverse speed ratio is established with the engagement of the torque-transmitting mechanisms 354 and 358.

During the reverse speed ratio, the ring gear member 334 and sun gear member 322 are rotated at a speed determined by the speed of the sun gear member 332 and the ring gear/sun gear tooth ratio of the planetary gearset 330. The planet carrier assembly member 326 and therefore output shaft 19 are rotated at a speed determined by the speed of the sun gear member 322 and the ring gear/sun gear tooth ratio of the planetary gearset 320. The numerical value of the reverse speed ratio is determined by the ring gear/sun gear tooth ratios of the planetary gearsets 320 and 330.

The first forward speed ratio is established with the engagement of the torque-transmitting mechanisms 356 and 358. During the first forward speed ratio, the sun gear members 342 and 332 are rotated at a speed determined by the speed of the ring gear member 344 and the ring gear/sun gear tooth ratio of the planetary gearset 340. The ring gear member 334 and sun gear member 322 are rotated at a speed determined by the speed of the sun gear member 332 and the ring gear/sun gear tooth ratio of the planetary gearset 330. The planet carrier assembly member 326 and therefore output shaft 19 are rotated at a speed determined by the speed of the sun gear member 322 and the ring gear/sun gear tooth ratio of the planetary gearset 320. The numerical value of the first forward speed ratio is determined by the ring gear/sun gear tooth ratios of all three planetary gearsets 320, 330, and 340.

The second forward speed ratio is established with the engagement of the torque-transmitting mechanisms 350 and 358. During the second forward speed ratio, the planet carrier assembly member 326 and therefore output shaft 19 are rotated at a speed determined by the speed of the sun gear member 322 and the ring gear/sun gear tooth ratio of the planetary gearset 320. The numerical value of the second forward speed ratio is determined by the ring gear/sun gear tooth ratio of the planetary gearset 320.

The third forward speed ratio is established with the engagement of the torque-transmitting mechanisms 350 and 356. During the third forward speed ratio, the sun gear members 342 and 332 are rotated at a speed determined by the speed of the ring gear member 344 and the ring gear/sun gear tooth ratio of the planetary gearset 340. The planet carrier assembly member 336 and ring gear member 324 are rotated at a speed determined by the speed of the sun gear member 332, the speed of the ring gear member 334, and the ring gear/sun gear tooth ratio of the planetary gearset 330. The planet carrier assembly member 326 and therefore output shaft 19 are rotated at a speed determined by the speed of the sun gear member 322, the speed of the ring gear member 324, and the ring gear/sun gear tooth ratio of the planetary gearset 320. The numerical value for the third forward speed ratio is determined by the ring gear/sun gear tooth ratios of all three planetary gearsets 320, 330, and 340.

The fourth forward speed ratio is established with the engagement of the torque-transmitting mechanisms 350 and 360. During the fourth forward speed ratio, the planet carrier assembly member 336 and ring gear member 324 are rotated at a speed determined by the speed of the ring gear member 334 and the ring gear/sun gear tooth ratio of the planetary gearset 330. The planet carrier assembly member 326 and therefore output shaft 19 are rotated at a speed determined by the speed of the sun gear member 322, the speed of the ring gear member 324, and the ring gear/sun gear tooth ratio of the planetary gearset 320. The numerical value of the fourth forward speed ratio is determined by the ring gear/sun gear tooth ratios of the planetary gearsets 320 and 330.

The fifth forward speed ratio is established with the engagement of the torque-transmitting mechanisms 350 and 352. During the fifth forward speed ratio, the planetary gearset 320 and therefore output shaft 19 are rotated in unison with the input shaft 17. The numerical value of the fifth forward speed ratio is one.

The sixth forward speed ratio is established with the engagement of the torque-transmitting mechanisms 352 and 360. During the sixth forward speed ratio, the ring gear member 334 and sun gear member 322 are rotated at a speed determined by the speed of the planet carrier assembly member 336 and the ring gear/sun gear tooth ratio of the planetary gearset 330. The planet carrier assembly member 326 and therefore output shaft 19 are rotated at a speed determined by the speed of the ring gear member 324, the speed of the sun gear member 322, and the ring gear/sun gear tooth ratio of the planetary gearset 320. The numerical value of the sixth forward speed ratio is determined by the ring gear/sun gear tooth ratios of the planetary gearsets 320 and 330.

The seventh forward speed ratio is established with the engagement of the torque-transmitting mechanisms 352 and 356. During the seventh forward speed ratio, the sun gear members 342 and 332 are rotated at a speed determined by the speed of the ring gear member 344 and the ring gear/sun gear tooth ratio of the planetary gearset 340. The ring gear member 334 and sun gear member 322 are rotated at a speed determined by the speed of the sun gear member 332, the speed of the planet carrier assembly member 336, and the ring gear/sun gear tooth ratio of the planetary gearset 330. The planet carrier assembly member 326 and therefore output shaft 19 are rotated at a speed determined by the speed of the ring gear member 324, the speed of the sun gear member 322, and the ring gear/sun gear tooth ratio of the planetary gearset 320. The numerical value for the seventh forward speed ratio is determined by the ring gear/sun gear tooth ratios of all three planetary gearsets 320, 330, and 340.

As with the previous family members of this invention, each of the forward ratio interchanges is a single transition interchange. That is only a single friction member is interchanged or swapped during each ratio change up and down. Also, the ratio interchange from reverse to forward is a single transition interchange when one of the torque transmitting mechanism 358 remains engaged through the neutral condition, thereby simplifying the shifting sequences and controls with the present invention.

Figures 9, 10:
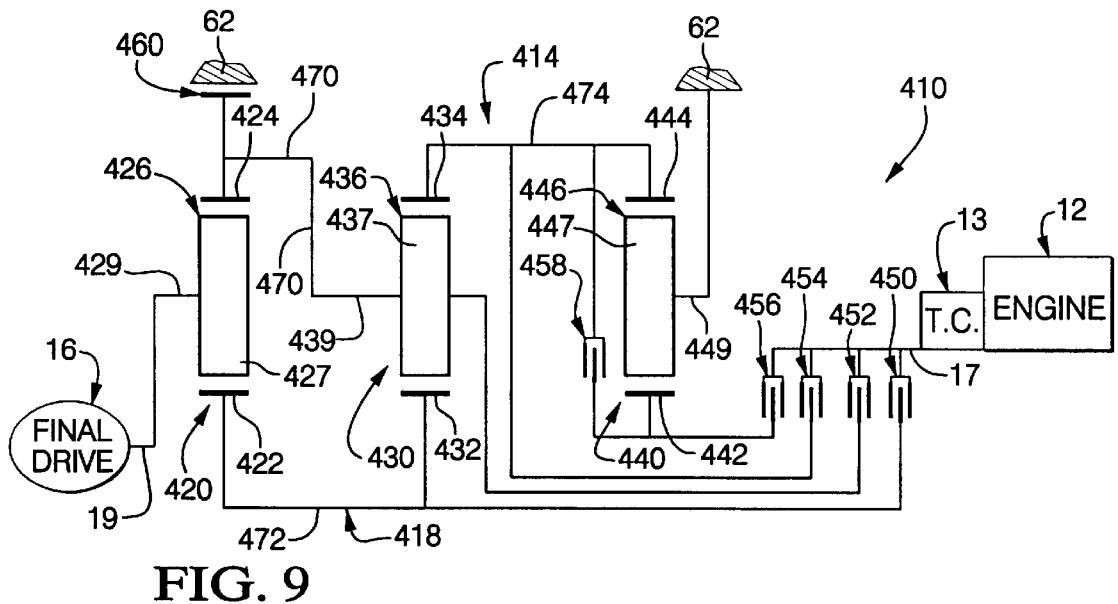
FIG. 9 is a schematic representation of a powertrain having another family transmission member of the present invention incorporated therein.
FIG. 10 is a truth table and chart depicting some of the operating parameters of the transmission shown in FIG. 9.

A powertrain 410, shown in FIG. 9, includes the engine 12, the torque converter 13, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440 and six torque-transmitting mechanisms 450, 452, 454, 456, 458, and 460. The torque-transmitting mechanism 460 is a stationary type torque-transmitting mechanism while the remaining torque-transmitting mechanisms are of the rotating type torque-transmitting mechanisms.

The planetary gearset 420 includes a sun gear member 422, a ring gear member 424, and a planet carrier assembly member 426. The planet carrier assembly member 426 includes a plurality of pinion gears 427 rotatably mounted on a planet carrier member 429 and disposed in meshing relationship with both the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 rotatably mounted on a planet carrier member 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier member 449 and disposed in meshing relationship with both the sun gear member 442 and the ring gear member 444.

The ring gear member 424 and planet carrier assembly member 436 are continuously interconnected by an interconnecting member 470, which is selectively connectible with the input shaft 17 through the torque-transmitting mechanism 452, and with the transmission housing 62 through the torque-transmitting mechanism 460. The sun gear members 422 and 432 are continuously interconnected by an interconnecting member 472, which is selectively connectible with the input shaft 17 through the torque-transmitting mechanism 450. The ring gear member 434 and ring gear member 444 are continuously interconnected by an interconnecting member 474, which is selectively connectible with the input shaft 17 through the torque-transmitting mechanism 454. The planet carrier assembly member 446 is continuously connected with the transmission housing 62. The output shaft 19 is continuously connected with the planet carrier assembly member 426. The sun gear member 442 is selectively connectible with the input shaft 17 through the torque-transmitting mechanism 456, and selectively connectible with the interconnecting member 474 through the torque-transmitting mechanism 458.

The truth table of FIG. 10 describes the engagement sequence and combinations for the torque-transmitting mechanisms in order to provide seven forward speed ratios and one reverse speed ratio between the input shaft 17 and the output shaft 19 through the planetary gear arrangement 418. Also given in the truth table is a numerical example of the speed ratios that can be obtained when the ring gear/sun gear tooth ratios of the planetary gearsets 420, 430, and 440 are as shown in the ratios R1/S1, R2/S2, and R3/S3, respectively. The chart of FIG. 10 gives a numerical example of the ratio steps between adjacent forward speed ratios as well as between the reverse and first forward speed ratio when the given speed ratios are employed. Also provided in the chart is the numerical value for the overall ratio spread of the forward speed ratios.

The reverse speed ratio is established with the engagement of the torque-transmitting mechanism 454 and 460. During the reverse speed ratio, the sun gear members 432 and 422 are rotated at a speed determined by the speed of the ring gear member 434 and the ring gear/sun gear tooth ratio of the planetary gearset 430. The planet carrier member 429 and therefore output shaft 19 are rotated at a speed determined by the speed of the sun gear member 422 and the ring gear/sun gear tooth ratio of the planetary gearset 420. The numerical value for the reverse speed ratio is determined by the ring gear/sun gear tooth ratios of the planetary gearsets 420 and 430.

The first forward speed ratio is established with the engagement of the torque-transmitting mechanisms 456 and 460. During the first forward speed ratio, the ring gear members 444 and 434 are rotated at a speed determined by the speed of the input shaft 17, the speed of the sun gear member 422, and the ring gear/sun gear tooth ratio of the planetary gearset 440. The sun gear members 422 and 432 are rotated at a speed determined by the speed of the ring gear member 434 and the ring gear/sun gear tooth ratio of the planetary gearset 430. The planet carrier assembly member 426 and therefore output shaft 19 are rotated at a speed determined by the speed of the sun gear member 422 and the ring gear/sun gear tooth ratio of the planetary gearset 420. The numerical value for the first forward speed ratio is determined by the ring gear/sun gear tooth ratios of all three planetary gearsets 420, 430, and 440.

The second forward speed ratio is established with the engagement of the torque-transmitting mechanisms 450 and 460. During the second forward speed ratio, the planet carrier assembly member 426 and therefore output shaft 19 are rotated at a speed determined by the speed of the sun gear member 422 and the ring gear/sun gear tooth ratio of the planetary gearset 420. The numerical value of the second forward speed ratio is determined by the ring gear/sun gear tooth ratio of the planetary gearset 420.

The third forward speed ratio is established with the engagement of the torque-transmitting mechanisms 450 and 456. During the third forward speed ratio, the ring gear members 444 and 434 are rotated at a speed determined by the speed of the sun gear member 442 and the ring gear/sun gear tooth ratio of the planetary gearset 440. The planet carrier assembly member 436 and ring gear member 424 are rotated at a speed determined by the speed of the ring gear member 434, the speed of the sun gear member 432, and the ring gear/sun gear tooth ratio of the planetary gearset 430. The planet carrier assembly member 426 and therefore output shaft 19 are rotated at a speed determined by the speed of the sun gear member 422, the speed of the ring gear member 424, and the ring gear/sun gear tooth ratio of the planetary gearset 420. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 450 and 458. During the fourth forward speed ratio, the planet carrier assembly member 436 and ring gear member 424 are rotated at a speed determined by the speed of the sun gear member 432 and the ring gear/sun gear tooth ratio of the planetary gearset 430. The planet carrier assembly member 426 and the output shaft 19 are rotated at a speed determined by the speed of the ring gear member 424, the speed of the sun gear member 422, and the ring gear/sun gear tooth ratio of the planetary gearset 420. The numerical value for the fourth forward speed ratio is determined by the ring gear/sun gear tooth ratios of the planetary gearsets 420 and 430.

The fifth forward speed ratio is established with the engagement of the torque-transmitting mechanisms 450 and 452. During the fifth forward speed ratio, the planetary gearset 420 and output shaft 19 rotate in unison with the input shaft 17. The numerical value of the fifth forward speed ratio is one.

The sixth forward speed ratio is established with the engagement of the torque-transmitting mechanisms 452 and 458. During the sixth forward speed ratio, the sun gear members 432 and 422 are rotated at a speed determined by the speed of the planet carrier assembly member 436 and the ring gear/sun gear tooth ratio of the planetary gearset 430. The output shaft 19 and planet carrier assembly member 426 are rotated at a speed determined by the speed of the sun gear member 422, the speed of the ring gear member 424, and the ring gear/sun gear tooth ratio of the planetary gearset 420. The numerical value of the sixth forward speed ratio is determined by the ring gear/sun gear tooth ratios of the planetary gearsets 420 and 430.

The seventh forward speed ratio is established with the engagement of the torque-transmitting mechanisms 452 and 456. During the seventh forward speed ratio, the ring gear members 444 and 434 are rotated at a speed determined by the speed of the sun gear member 442 and the ring gear/sun gear tooth ratio of the planetary gearset 440. The sun gear members 432 and 422 are rotated at a speed determined by the speed of the ring gear member 434, the speed of the planet carrier assembly member 436, and the ring gear/sun gear tooth ratio of the planetary gearset 430. The planet carrier assembly member 426 and therefore output shaft 19 are rotated at a speed determined by the speed of the ring gear member 424, the speed of the sun gear member 422, and the ring gear/sun gear tooth ratio of the planetary gearset 420. The numerical value of the seventh forward speed ratio is determined by the ring gear/sun gear tooth ratios of all three planetary gearsets 420, 430, and 440.

Figures 11, 12:
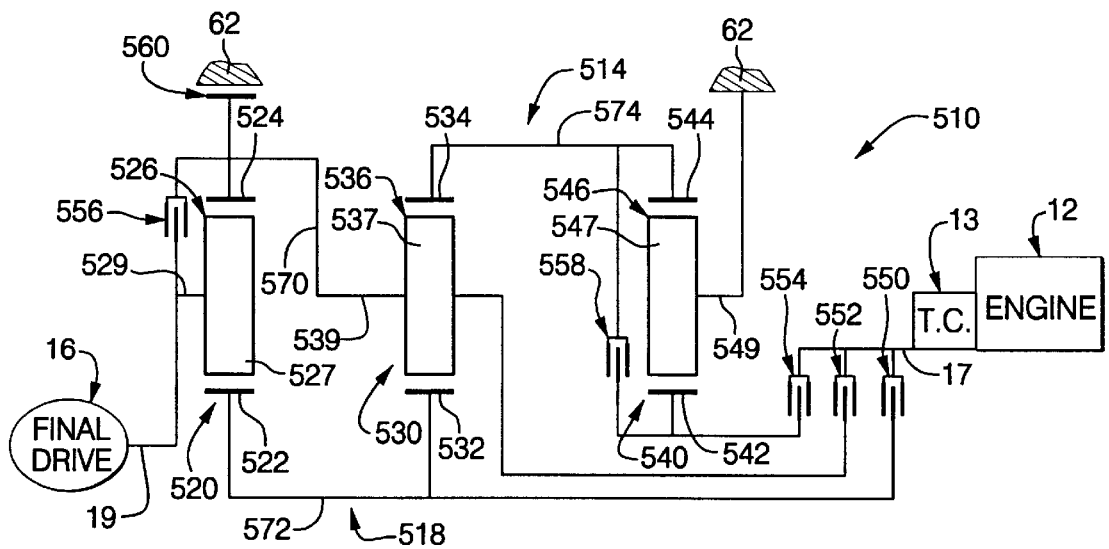
FIG. 11 is a schematic representation of a powertrain having another family transmission member of the present invention incorporated therein.
FIG. 12 is a truth table and chart depicting some of the operating parameters of the transmission shown in FIG. 11.

A powertrain 510, shown in FIG. 11, includes the engine 12, the torque converter 13, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540 and six torque-transmitting mechanisms 550, 552, 554, 556, 558, and 560. The torque-transmitting mechanism 560 is a stationary type torque-transmitting mechanism while the remaining torque-transmitting mechanisms are of the rotating type torque-transmitting mechanisms.

The planetary gearset 520 includes a sun gear member 522, a ring gear member 524, and a planet carrier assembly member 526. The planet carrier assembly member 526 includes a plurality of pinion gears 527 rotatably mounted on a planet carrier member 529 and disposed in meshing relationship with both the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 rotatably mounted on a planet carrier member 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier member 549 and disposed in meshing relationship with both the sun gear member 542 and the ring gear member 544.

The ring gear member 524 and planet carrier assembly member 536 are continuously interconnected by an interconnecting member 570, which is selectively connectible with the input shaft 17 through the torque-transmitting mechanism 552, and selectively connectible with the output shaft 19 through the torque-transmitting mechanism 556. The sun gear members 522 and 532 are continuously interconnected by an interconnecting member 572, which is selectively connectible with the input shaft 17 through the torque-transmitting mechanism 550. The ring gear members 534 and 544 are continuously interconnected by an interconnecting member 574, which is selectively connectible with the sun gear member 542 through the torque-transmitting mechanism 558. The planet carrier assembly member 546 is continuously connected with the transmission housing 62. The output shaft 19 is continuously connected with the planet carrier assembly member 526. The input shaft 17 is selectively connectible with the sun gear member 542 through the torque-transmitting mechanism 554. The interconnecting member 570 is selectively connectible with the transmission housing 62 through the torque-transmitting mechanism 560.

The truth table of FIG. 12 describes the sequence and combinations of engagements for the torque-transmitting mechanisms in order to provide seven forward speed ratios and one reverse speed ratio through the planetary gear arrangement 518 between the input shaft 17 and the output shaft 19. Also provided in the truth table is a numerical example of the speed ratios, which are established by the ring gear/sun gear tooth ratios of the planetary gearsets 520, 530, and 540 when the respective ring gear/sun gear tooth ratios are equal to the ratios R1/S1, R2/S2, and R3/S3. The chart in FIG. 12 provides the numerical example of the ratio steps between adjacent forward speed ratios as well as between the reverse and first forward speed ratio. Also given in the chart of FIG. 12 is the numerical example of the overall ratio spread for the forward speed ratios.

The reverse speed ratio is established with the engagement of the torque-transmitting mechanisms 554 and 556. During the reverse speed ratio the output shaft 19 is selectively connected with the ring gear member 544. The ring gear member 544 and the output shaft 19 are rotated at a speed determined by the speed of the sun gear member 542 and the ring gear/sun gear tooth ratio of the planetary gearset 540. The numerical value of the reverse speed ratio is determined by the ring gear/sun gear tooth ratio of the planetary gearset 540.

The first forward speed ratio is established with the engagement of the torque-transmitting mechanisms 554 and 560. During the first forward speed ratio, the ring gear members 544 and 534 are rotated at a speed determined by the speed of the sun gear member 542 and the ring gear/sun gear tooth ratio of the planetary gearset 540. The sun gear members 532 and 522 are rotated at a speed determined by the speed of the ring gear member 534 and the ring gear/sun gear tooth ratio of the planetary gearset 530. The planet carrier assembly member 556 and therefore output shaft 19 are rotated at a speed determined by the speed of the sun gear member 522 and the ring gear/sun gear tooth ratio of the planetary gearset 520. The numerical value of the first forward speed ratio is determined by the ring gear/sun gear tooth ratios of all three planetary gearsets 520, 530, and 540.

The second forward speed ratio is established with the engagement of the torque-transmitting mechanisms 550 and 560. During the second forward speed ratio, the planet carrier assembly member 526 and therefore output shaft 19 are rotated at a speed determined by the speed of the sun gear member 522 and the ring gear/sun gear tooth ratio of the planetary gearset 520. The numerical value of the second forward speed ratio is determined by the ring gear/sun gear tooth ratio of the planetary gearset 520.

The third forward speed ratio is established with the engagement of the torque-transmitting mechanisms 550 and 554. During the third forward speed ratio, the ring gear members 544 and 534 are rotated at a speed determined by the speed of the sun gear member 542 and the ring gear/sun gear tooth ratio of the planetary gearset 540. The planet carrier assembly member 536 and ring gear member 524 are rotated at a speed determined by the speed of the ring gear member 534, the speed of the sun gear member 532, and the ring gear/sun gear tooth ratio of the planetary gearset 530. The planet carrier assembly member 526 and therefore output shaft 19 are rotated at a speed determined by the speed of the sun gear member 522, the speed of the ring gear member 524, and the ring gear/sun gear tooth ratio of the planetary gearset 520. The numerical value of the third forward speed ratio is determined by the ring gear/sun gear tooth ratios of all three planetary gearsets 520, 530, and 540.

The fourth forward speed ratio is established with the engagement of the torque-transmitting mechanisms 550 and 558. During the fourth forward speed ratio, the planet carrier assembly member 536 and ring gear member 524 are rotated at a speed determined by the speed of the sun gear member 532 and the ring gear/sun gear tooth ratio of the planetary gearset 530. The planet carrier assembly member 526 and therefore output shaft 19 are rotated at a speed determined by the speed of the sun gear member 522, the speed of the ring gear member 524, and the ring gear/sun gear tooth ratio of the of planetary gearset 520. The numerical value of the fourth forward speed ratio is determined by the ring gear/sun gear tooth ratios of the planetary gearsets 530 and 520.

The fifth forward speed ratio is established with the engagement of the torque-transmitting mechanisms 550 and 552. During the fifth forward speed ratio, the planetary gearset 520 and therefore output shaft 19 rotate in unison with the input shaft 17. The numerical value of the fifth forward speed ratio is one.

The sixth forward speed ratio is established with the engagement of the torque-transmitting mechanisms 552 and 558. During the sixth forward speed ratio, the sun gear members 532 and 522 are rotated at a speed determined by the speed of the planet carrier assembly member 536 and the ring gear/sun gear tooth ratio of the planetary gearset 530. The planet carrier assembly member 526 and therefore output shaft 19 are rotated at a speed determined by the speed of the sun gear member 522, the speed of the ring gear member 524, and the ring gear/sun gear tooth ratio of the planetary gearset 520. The numerical value of the sixth forward speed ratio is determined by the ring gear/sun gear tooth ratios of the planetary gearsets 520 and 530.

The seventh forward speed ratio is established with the engagement of the torque-transmitting mechanisms 552 and 554. During the seventh forward speed ratio, the ring gear members 534 and 544 are rotated at a speed determined by the speed of the sun gear member 542 and the ring gear/sun gear tooth ratio of the planetary gearset 540. The sun gear members 532 and 522 are rotated at a speed determined by the speed of the ring gear member 534, the speed of the planet carrier assembly member 536, and the ring gear/sun gear tooth ratio of the planetary gearset 530. The planet carrier assembly member 526 and therefore output shaft 19 are rotated at a speed determined by the speed of the ring gear member 524, the speed of the sun gear member 522, and the ring gear/sun gear tooth ratio of the planetary gearset 520. The numerical value of the seventh forward speed ratio is determined by the ring gear/sun gear tooth ratios of all three planetary gearsets 520, 530, and 540.

As with the previous family members, each of the forward ratio interchanges is of the single transition variety and the ratio interchange from forward to reverse can also be of the single transition variety since the torque-transmitting mechanism 554 can remain engaged through the neutral condition, if desired.

Figures 13, 14:
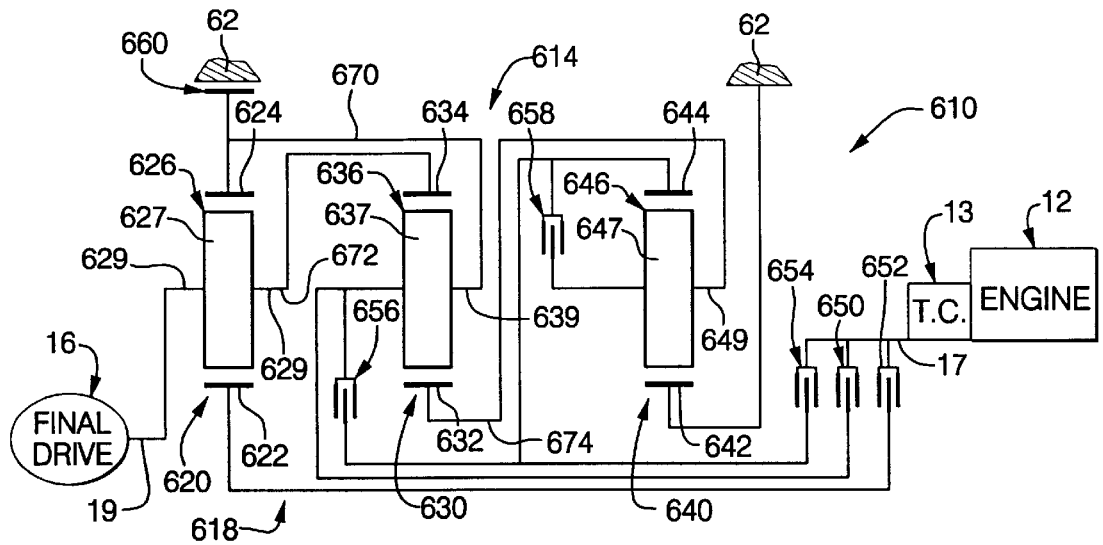
FIG. 13 is a schematic representation of a powertrain having another family transmission member of the present invention incorporated therein.
FIG. 14 is a truth table and chart depicting some of the operating parameters of the transmission shown in FIG. 13.

A powertrain 610, shown in FIG. 13, includes the engine 12, the torque converter 13, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640 and six torque-transmitting mechanisms 650, 652, 654, 656, 658, and 660. The torque-transmitting mechanism 660 is a stationary type torque-transmitting mechanism while the remaining torque-transmitting mechanisms are of the rotating type torque-transmitting mechanisms.

The planetary gearset 620 includes a sun gear member 622, a ring gear member 624, and a planet carrier assembly member 626. The planet carrier assembly member 626 includes a plurality of pinion gears 627 rotatably mounted on a planet carrier member 629 and disposed in meshing relationship with both the sun gear member 622 and the ring gear member 624.

The planetary gearset 630 includes a sun gear member 632, a ring gear member 634, and a planet carrier assembly member 636. The planet carrier assembly member 636 includes a plurality of pinion gears 637 rotatably mounted on a planet carrier member 639 and disposed in meshing relationship with both the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier member 649 and disposed in meshing relationship with both the sun gear member 642 and the ring gear member 644.

The ring gear member 624 and planet carrier assembly member 636 are continuously interconnected by an interconnecting member 670, which is selectively connectible with the input shaft 17 through the torque-transmitting mechanism 650, and selectively connectible with the transmission housing 62 through the torque-transmitting mechanism 660. The planet carrier assembly member 626 and ring gear member 634 are continuously interconnected by an interconnecting member 672, which is continuously connected with the output shaft 19. The sun gear member 632 and planet carrier assembly member 646 are continuously interconnected by the interconnecting member 674. The sun gear member 642 is continuously connected with the transmission housing 62.

The input shaft 17 is selectively connectible with the sun gear member 622 through the torque-transmitting mechanism 652, and selectively connectible with the ring gear member 644 through the torque-transmitting mechanism 654. The ring gear member 644 is selectively connectible with the planet carrier assembly member 646 through the torque-transmitting mechanism 658, and with the interconnecting member 672 through the torque-transmitting mechanism 656.

The truth table of FIG. 14 describes the engagement sequence and combinations for the torque-transmitting mechanisms in order to provide seven forward speed ratios and one reverse speed ratio through the planetary gear arrangement 618 between the input shaft 17 and the output shaft 19. Also provided in the truth table is a numerical example of the speed ratios, which are established by the ring gear/sun gear tooth ratios of the planetary gearsets 620, 630, and 640 when the respective ring gear/sun gear tooth ratios are equal to the ratios R1/S1, R2/S2, and R3/S3. The chart in FIG. 14 provides the numerical example of the ratio steps between adjacent forward speed ratios as well as between the reverse and first forward speed ratio. Also given in the chart of FIG. 14 is the numerical example of the overall ratio spread for the forward speed ratios.

The reverse speed ratio is established with the engagement of the torque-transmitting mechanisms 654 and 650.

During the reverse speed ratio, the planet carrier assembly member 646 and sun gear member 632 are rotated at a speed determined by the speed of the ring gear member 644 and the ring gear/sun gear tooth ratio of the planetary gearset 640. The ring gear member 634 and therefore output shaft 19 are rotated at a speed determined by the speed of the sun gear member 632 and the ring gear/sun gear tooth ratio of the planetary gearset 630. The numerical value for the reverse speed ratio is determined by the ring gear/sun gear tooth ratios of the planetary gearsets 630 and 640. These ring gear/sun gear tooth ratios are given in FIG. 14 as the ratios R2/S2 and R3/S3. The ring gear/sun gear tooth ratio for the planetary gearset 620 is given as the ratio R1/S1.

The first forward speed ratio is established with the engagement of the torque-transmitting mechanisms 652 and 660. During the first forward speed ratio, the planet carrier assembly member 626 and therefore output shaft 19 are rotated at a speed determined by the speed of the sun gear member 622 and the ring gear/sun gear tooth ratio of the planetary gearset 620. The numerical value of the first forward speed ratio is determined by the ring gear/sun gear tooth ratio of the planetary gearset 620.

The second forward speed ratio is established with the engagement of the torque-transmitting mechanisms 652 and 658. During the second forward speed ratio, the ring gear member 624 and the planet carrier assembly member 636 are rotated at a speed determined by the speed of the input shaft 17, the speed of the sun gear member 622, and the speed of the planet carrier assembly member 626, and the ring gear/sun gear tooth ratio of the planetary gearset 620. The speed of the ring gear member 634, the speed of the planet carrier assembly member 626, and the speed of the output shaft 19 are determined by the speed of the planet carrier assembly member 636 and the ring gear/sun gear tooth ratio of the planetary gearset 630. The numerical value of the second forward speed ratio is determined by the ring gear/sun gear tooth ratios of the planetary gearsets 620 and 630.

The third forward speed ratio is established with the engagement of the torque-transmitting mechanisms 652 and 656. During the third forward speed ratio, the speed of the ring gear member 622, the speed of the planet carrier assembly member 636, and the speed of the ring gear member 644 are determined by the speed of the sun gear member 622, the speed of the planet carrier assembly member 626, and the ring gear/sun gear tooth ratio of the planetary gearset 620. The speed of the planet carrier assembly member 646 and sun gear member 632 are determined by the speed of the ring gear member 644 and the ring gear/sun gear tooth ratio of the planetary gearset 640. The speed of the ring gear member 634, planet carrier assembly member 626, and output shaft 19 are determined by the speed of the sun gear member 632, the speed of the planet carrier assembly member 636, and the ring gear/sun gear tooth ratio of the planetary gearset 630. The numerical value for the third forward speed ratio is determined by the ring gear/sun gear tooth ratios of all three planetary gearsets 620, 630, and 640.

The fourth forward speed ratio is established with the engagement of the torque-transmitting mechanisms 652 and 654. During the fourth forward speed ratio, the planet carrier assembly member 646 and sun gear member 632 are rotated at a speed determined by the speed of the ring gear member 644 and the ring gear/sun gear tooth ratio of the planetary gearset 640. The speed of the ring gear member 624 and planet carrier assembly member 636 are determined by the speed of the input shaft 17 and sun gear member 622, the speed of the planet carrier assembly member 626, and the ring gear/sun gear tooth ratio of the planetary gearset 620. The speed of the ring gear member 634, the speed of the planet carrier assembly member 626, and the speed of the output shaft 19 are determined by the speed of the sun gear member 632, the speed of the planet carrier assembly member 636, and the ring gear/sun gear tooth ratio of the planetary gearset 630. The numerical value of the fourth forward speed ratio is determined by the ring gear/sun gear tooth ratios of all three planetary gearsets 620, 630, and 640.

The fifth forward speed ratio is established with the engagement of the torque-transmitting mechanisms 650 and 652. During the fifth forward speed ratio, the planetary gearset 620 and output shaft 19 are rotated in unison with the input shaft 17. The numerical value of the fifth forward speed ratio is one.

The sixth forward speed ratio is established with the engagement of the torque-transmitting mechanisms 650 and 654. During the sixth forward speed ratio, the planet carrier assembly member 646 and sun gear member 632 are rotated at a speed determined by the speed of the ring gear member 644 and the ring gear/sun gear tooth ratio of the planetary gearset 640. The ring gear member 634, the planet carrier assembly member 626, and the output shaft 19 are rotated at a speed determined by the speed of the planet carrier assembly member 636, the speed of the sun gear member 632, and the ring gear/sun gear tooth ratio of the planetary gearset 630. The numerical value of the sixth forward speed ratio is determined by the ring gear/sun gear tooth ratios of the planetary gearsets 630 and 640.

The seventh forward speed ratio is established with the engagement of the torque-transmitting mechanisms 650 and 658. During the seventh forward speed ratio, the ring gear member 634 and therefore output shaft 19 are rotated at a speed determined by the speed of the planet carrier assembly member 636 and the ring gear/sun gear tooth ratio of the planetary gearset 630. The numerical value of the seventh forward speed ratio is determined by the ring gear/sun gear tooth ratio of the planetary gearset 630.

As is evident from the above, each of the single step interchanges in the forward direction are of the single transition variety. Also, the reverse to first forward speed ratio interchange can also be of the single transition variety since the torque-transmitting mechanism 660 can remain engaged through the neutral condition.

Figures 15, 16:
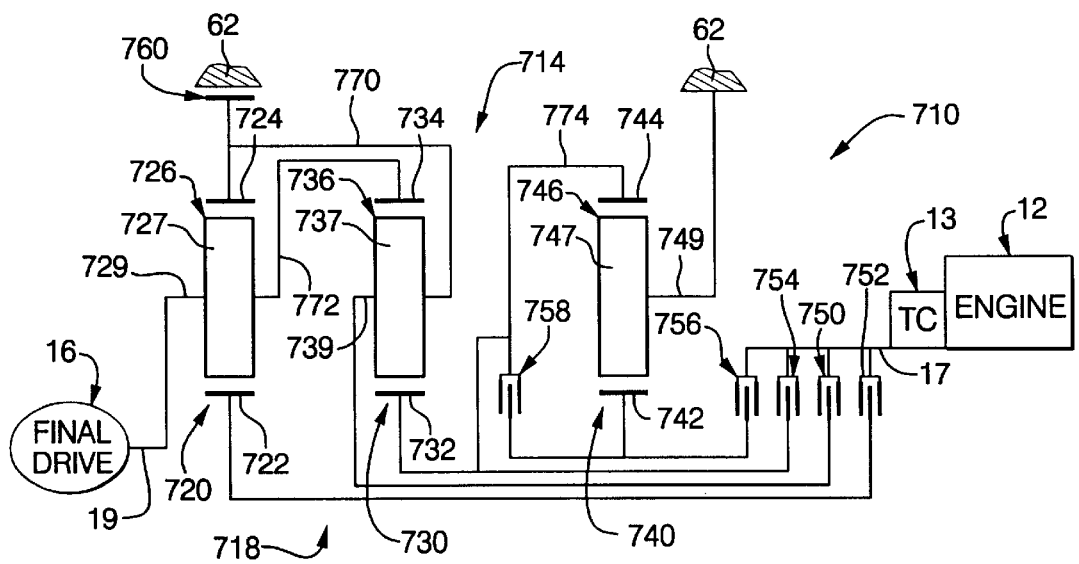
FIG. 15 is a schematic representation of a powertrain having another family transmission member of the present invention incorporated therein.
FIG. 16 is a truth table and chart depicting some of the operating parameters of the transmission shown in FIG. 15.

A powertrain 710, shown in FIG. 15, includes the engine 12, the torque converter 13, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740 and six torque-transmitting mechanisms 750, 752, 754, 756, 758, and 760. The torque-transmitting mechanism 760 is a stationary type torque-transmitting mechanism while the remaining torque-transmitting mechanisms are of the rotating type torque-transmitting mechanisms.

The planetary gearset 720 includes a sun gear member 722, a ring gear member 724, and a planet carrier assembly member 726. The planet carrier assembly member 726 includes a plurality of pinion gears 727 rotatably mounted on a planet carrier member 729 and disposed in meshing relationship with both the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 rotatably mounted on a planet carrier member 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 rotatably mounted on a planet carrier member 749 and disposed in meshing relationship with both the sun gear member 742 and the ring gear member 744.

The ring gear member 724 and planet carrier assembly member 736 are continuously interconnected by an interconnecting member 770, which is selectively connectible with the input shaft 17 through the torque-transmitting mechanism 750, and selectively connectible with the transmission housing 62 through the torque-transmitting mechanism 760. The ring gear member 734 and planet carrier assembly member 726 are continuously interconnected by an interconnecting member 772, which is also continuously connected with the output shaft 19. The sun gear member 732 and ring gear member 744 are continuously interconnected by an interconnecting member 774, which is selectively connectible with the input shaft 17 through the torque-transmitting mechanism 754, and selectively connectible with the sun gear member 742 through the torque-transmitting mechanism 758. The planet carrier member 749 and therefore planet carrier assembly member 746 are continuously interconnected with the transmission housing 62. The input shaft 17 is selectively connectible with the sun gear member 722 through the torque-transmitting mechanism 752 and selectively connectible with the sun gear member 742 through the torque-transmitting mechanism 756.

The truth table of FIG. 16 describes the engagement combinations and sequence for the torque-transmitting mechanisms in order to establish seven forward speed ratios and one reverse speed ratio in the planetary gear arrangement 718 between the input shaft 17 and the output shaft 19. The truth table in FIG. 16 also provides a numerical example for the speed ratios of the seven forward speed ratios and the one reverse speed ratio. The numerical values are determined by the ring gear/sun gear tooth ratios of the planetary gearsets 720, 730, and 740, which are given as the ratios R1/S1, R2/S2, and R3/S3, respectively. Further information provided in FIG. 16 by way of a chart is the numerical value for the ratio steps between adjacent forward speed ratios as well as between the reverse and first forward speed ratio. The overall ratio spread of the forward speed ratios is also given in the chart of FIG. 16.

The reverse speed ratio is established with the engagement of the torque-transmitting mechanisms 754 and 760. During the reverse speed ratio, the ring gear member 734 and therefore output shaft 19 are rotated at a speed determined by the speed of the sun gear member 732 and the ring gear/sun gear tooth ratio of the planetary gearset 730. The numerical value of the reverse speed ratio is determined by the ring gear/sun gear tooth ratio of the planetary gearset 730.

The first forward speed ratio is established with the engagement of the torque-transmitting mechanisms 756 and 760. During the first forward speed ratio, the ring gear member 744 and sun gear member 732 are rotated at a speed determined by the speed of the sun gear member 742 and the ring gear/sun gear tooth ratio of the planetary gearset 740. The speed of the ring gear member 734 and therefore the output shaft 19 are determined by the speed of the sun gear member 732 and the ring gear/sun gear tooth ratio of the planetary gearset 730. The numerical value for the first forward speed ratio is determined by the ring gear/sun gear tooth ratios of the planetary gearsets 730 and 740.

The second forward speed ratio is established with the engagement of the torque-transmitting mechanisms 752 and 760. During the second forward speed ratio, the speed of the planet carrier assembly member 726 and therefore output shaft 19 are determined by the speed of the sun gear member 722 and the ring gear/sun gear tooth ratio of the planetary gearset 720. The numerical value for the second forward speed ratio is determined by the ring gear/sun gear tooth ratio of the planetary gearset 720.

The third forward speed ratio is established with the engagement of the torque-transmitting mechanisms 752 and 756. During the third forward speed ratio, the ring gear member 744 and sun gear member 732 are rotated at a speed determined by the speed of the sun gear member 742 and the ring gear/sun gear tooth ratio of the planetary gearset 740. The planet carrier assembly member 736 and ring gear member 724 are rotated at a speed determined by the speed of the sun gear member 732, the speed of the ring gear member 734, and the ring gear/sun gear tooth ratio of the planetary gearset 730. The speed of the ring gear member 734, the speed of the planet carrier assembly member 726, and the speed of the output shaft 19 are determined by the speed of the sun gear member 722, the speed of the ring gear member 724, and the ring gear/sun gear tooth ratio of the planetary gearset 720. The numerical value for the third forward speed ratio is determined by the ring gear/sun gear tooth ratios of all three planetary gearsets 720, 730, and 740.

The fourth forward speed ratio is established with the engagement of the torque-transmitting mechanisms 752 and 758. During the fourth forward speed ratio, the speed of the ring gear member 724 and the speed of the planet carrier assembly member 736 are determined by the speed of the planet carrier assembly member 726, the speed of the sun gear member sun gear member 722, and the ring gear/sun gear tooth ratio of the planetary gearset 720. The speed of the ring gear member 734, the speed of the planet carrier assembly member 726, and the speed of the output shaft 19 are determined by the speed planet carrier assembly member 736 and the ring gear/sun gear tooth ratio of the planetary gearset 730. The numerical value for the fourth forward speed ratio is determined by the ring gear/sun gear tooth ratios of the planetary gearsets 720 and 730.

The fifth forward speed ratio is established with the engagement of the torque-transmitting mechanisms 750 and 752. During the fifth forward speed ratio, the planetary gearset 720 is rotated in unison with the input shaft 17 and therefore the output shaft 19 rotates in unison with the input shaft 17. The numerical value of the fifth forward speed ratio is one.

The sixth forward speed ratio is established with the engagement of the torque-transmitting mechanisms 750 and 758. During the sixth forward speed ratio, the ring gear member 734 and therefore the output shaft 19 are rotated at a speed determined by the speed of the planet carrier assembly member 736 and the ring gear/sun gear tooth ratio of the planetary gearset 730. The numerical value for the sixth forward speed ratio is determined by the ring gear/sun gear tooth ratio of the planetary gearset 730.

The seventh forward speed ratio is established with the engagement of the torque-transmitting mechanisms 750 and 756. During the seventh forward speed ratio, the ring gear member 744 and the sun gear member 732 are rotated at a speed determined by the speed of the sun gear member 742 and the ring gear/sun gear tooth ratio of the planetary gearset 740. The ring gear member 734 and therefore output shaft 19 are rotated at a speed determined by the speed of the sun gear member 732, the speed of the planet carrier assembly member 736, and the ring gear/sun gear tooth ratio of the planetary gearset 730. The numerical value of the seventh forward speed ratio is determined by the ring gear/sun gear tooth ratios of the planetary gearsets 730 and 740.

As with the preceding family members, each of the forward single step ratio interchanges is of the single transition variety. The reverse to first ratio interchange can be simplified by permitting the torque-transmitting mechanism 760 to remain engaged through the neutral condition.

Figures 17, 18:
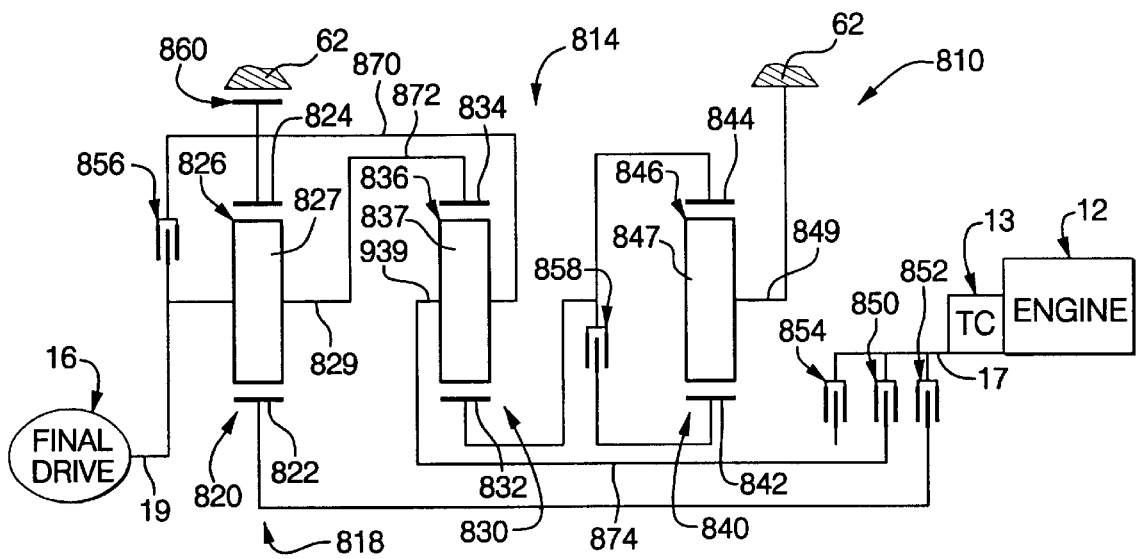
FIG. 17 is a schematic representation of a powertrain having another family transmission member of the present invention incorporated therein.
FIG. 18 is a truth table and chart depicting some of the operating parameters of the transmission shown in FIG. 17.

A powertrain 810, shown in FIG. 17, includes the engine 12, the torque converter 13, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840 and six torque-transmitting mechanisms 850, 852, 854, 856, 858, and 860. The torque-transmitting mechanism 860 is a stationary type torque-transmitting mechanism while the remaining torque-transmitting mechanisms are of the rotating type torque-transmitting mechanisms.

The planetary gearset 820 includes a sun gear member 822, a ring gear member 824, and a planet carrier assembly member 826. The planet carrier assembly member 826 includes a plurality of pinion gears 827 rotatably mounted on a planet carrier member 829 and disposed in meshing relationship with both the sun gear member 822 and the ring gear member 824.

The planetary gearset 830 includes a sun gear member 832, a ring gear member 834, and a planet carrier assembly member 836. The planet carrier assembly member 836 includes a plurality of pinion gears 837 rotatably mounted on a planet carrier member 839 and disposed in meshing relationship with both the sun gear member 832 and the ring gear member 834.

The planetary gearset 840 includes a sun gear member 842, a ring gear member 844, and a planet carrier assembly member 846. The planet carrier assembly member 846 includes a plurality of pinion gears 847 rotatably mounted on a planet carrier member 849 and disposed in meshing relationship with both the sun gear member 842 and the ring gear member 844.

The ring gear member 824 and planet carrier assembly member 836 are continuously interconnected by an interconnecting member 870, which is selectively connectible with the input shaft 17 through the torque-transmitting mechanism 850, and selectively connectible with the transmission housing 62 through the torque-transmitting mechanism 860, and selectively connectible with the output shaft 19 through the torque-transmitting mechanism 856. The planet carrier assembly member 826 and ring gear member 834 are continuously interconnected by an interconnecting member 872, which is continuously connected with the output shaft 19. The sun gear member 832 and ring gear member 844 are continuously interconnected by an interconnecting member 874, which is selectively connectible with the sun gear member 842 through the torque-transmitting mechanism 858. The planet carrier assembly member 846 is continuously connected with the transmission housing 62. The input shaft 17 is selectively connectible with the sun gear member 822 through the torque-transmitting mechanism 852, and selectively connectible with the sun gear member 842 through the torque-transmitting mechanism 854.

The truth table shown in FIG. 18 describes the engagement sequence and combinations for the torque-transmitting mechanisms in order to establish seven forward speed ratios and one reverse speed ratio between the input shaft 17 and the output shaft 19 through the planetary gear arrangement 818. Also given in the truth table is a numerical example for the speed ratios that are possible with the planetary gear arrangement 818 when the ring gear/sun gear tooth ratios of the planetary gearsets 820, 830, and 840 are selected as shown as R1/S1, R2/S2, and R3/S3, respectively. Further information given in FIG. 18 is a chart, which provides the numerical values for the ratio steps between adjacent forward speed ratios as well as between the reverse and first forward speed ratio. Also given in the chart of FIG. 18 is the numerical value for the overall ratio spread of the forward speed ratios.

The reverse speed ratio is established with the engagement of the torque-transmitting mechanisms 854 and 856. During the reverse speed ratio, the planetary gearsets 820 and 830 and therefore output shaft 19 rotate in unison with the ring gear member 844. The speed of the ring gear member 844 and therefore output shaft 19 is determined by the speed of the sun gear member 842 and the ring gear/sun gear tooth ratio of the planetary gearset 840. The numerical value for the reverse speed ratio is determined by the ring gear/sun gear tooth ratio of the planetary gearset 840.

The first forward speed ratio is established with the engagement of the torque-transmitting mechanisms 854 and 860. During the first forward speed ratio, the ring gear member 844 and sun gear member 832 are rotated at a speed determined by the speed of the sun gear member 842 and the ring gear/sun gear tooth ratio of the planetary gearset 840. The speed of the ring gear member 834 and therefore output shaft 19 are determined by the speed of the sun gear member 832 and the ring gear/sun gear tooth ratio of the planetary gearset 830. The numerical value of the first forward speed ratio is determined by the ring gear/sun gear tooth ratios of the planetary gearsets 830 and 840.

The second forward speed ratio is established with the engagement of the torque-transmitting mechanisms 852 and 860. During the second forward speed ratio, the planet carrier assembly member 826 and output shaft 19 are rotated at a speed determined by the speed of the sun gear member 822 and the ring gear/sun gear tooth ratio of the planetary gearset 820. The numerical value of the second forward speed ratio is determined by the ring gear/sun gear tooth ratio of the planetary gearset 820.

The third forward speed ratio is established with the engagement of the torque-transmitting mechanisms 852 and 854. During the third forward speed ratio, the ring gear member 844 and sun gear member 832 are rotated at a speed determined by the speed of the input shaft 17, the speed of the sun gear member 842, and the ring gear/sun gear tooth ratio of the planetary gearset 840. The speed of the ring gear member 824 and planet carrier assembly member 836 are determined by the speed of the sun gear member 822, the speed of the planet carrier assembly member 826, and the ring gear/sun gear tooth ratio of the planetary gearset 820. The speed of the ring gear member 834, the planet carrier assembly member 826, and the output shaft 19 are determined by the speed of the sun gear member 832, the speed of the planet carrier assembly member 836, and the ring gear/sun gear tooth ratio of the planetary gearset 830. The numerical value for the third forward speed ratio is determined by the ring gear/sun gear tooth ratios of all three planetary gearsets 820, 830, and 840.

The fourth forward speed ratio is established with the engagement of the torque-transmitting mechanisms 852 and 858. During the fourth forward speed ratio, the speed of the ring gear member 824 and planet carrier assembly member 836 are determined by the speed of the sun gear member 822, the speed of the planet carrier assembly member 826, and the ring gear/sun gear tooth ratio of the planetary gearset 820. The speed of the ring gear member 834, the speed of the planet carrier assembly member 826, and the speed of the output shaft 19 are determined by the speed of the planet carrier assembly member 836 and the ring gear/sun gear tooth ratio of the planetary gearset 830. The numerical value for the fourth forward speed ratio is determined by the ring gear/sun gear tooth ratios of the planetary gearsets 820 and 830.

The fifth forward speed ratio is established with the engagement of the torque-transmitting mechanisms 850 and 852. During the fifth forward speed ratio, the planetary gearset 820 and output shaft 19 are rotated in unison with the input shaft 17. The numerical value of the fifth forward speed ratio is one.

The sixth forward speed ratio is established with the engagement of the torque-transmitting mechanisms 850 and 858. During the sixth forward speed ratio, the ring gear member 834 and therefore output shaft 19 are rotated at a speed determined by the speed of the planet carrier assembly member 836 and the ring gear/sun gear tooth ratio of the planetary gearset 830. The numerical value of the sixth forward speed ratio is determined by the ring gear/sun gear tooth ratio of the planetary gearset 830.

The seventh forward speed ratio is established with the engagement of the torque-transmitting mechanisms 850 and 854. During the seventh forward speed ratio, the ring gear member 844 and sun gear member 832 are rotated at a speed determined by the speed of the sun gear member 842 and the ring gear/sun gear tooth ratio of the planetary gearset 840. The ring gear member 834 and therefore output shaft 19 are rotated at a speed determined by the speed of the sun gear member 832, the speed of the planet carrier assembly member 836, and the ring gear/sun gear tooth ratio of the planetary gearset 830. The numerical value of the seventh forward speed ratio is determined by the ring gear/sun gear tooth ratios of the planetary gearsets 830 and 840.

As with the previously described family members, each of the forward speed ratio single step interchanges is of the single transition variety as is the reverse to forward speed interchange, if one desires to have the torque-transmitting mechanism 854 remain engaged through the neutral condition.

Figures 19, 20:
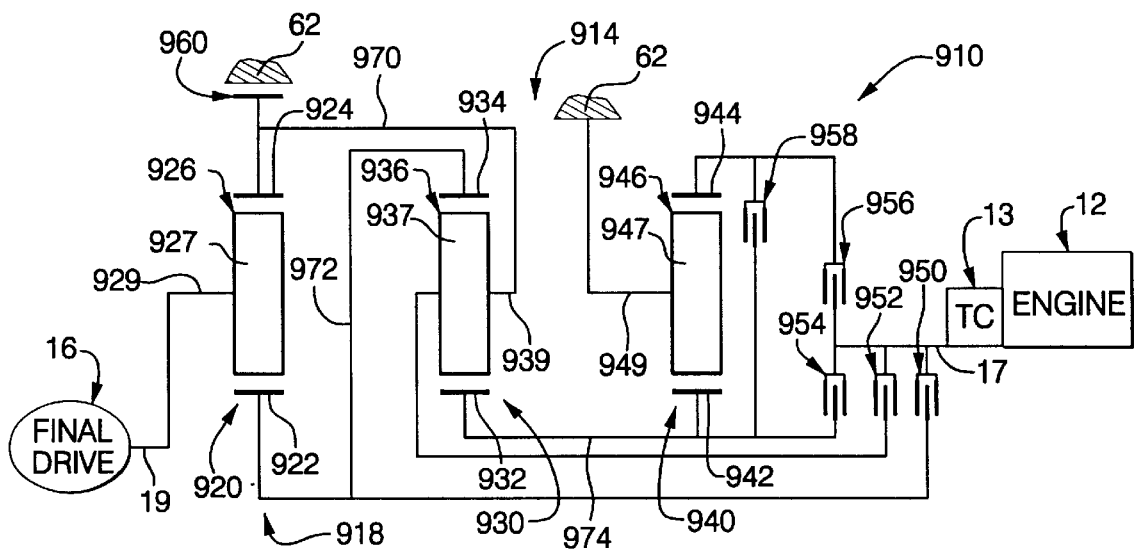
FIG. 19 is a schematic representation of a powertrain having another family transmission member of the present invention incorporated therein.
FIG. 20 is a truth table and chart depicting some of the operating parameters of the transmission shown in FIG. 19.

A powertrain 910, shown in FIG. 19, includes the engine 12, the torque converter 13, a planetary transmission 914, and the final drive mechanism 16. The planetary transmission 914 includes the input shaft 17, a planetary gear arrangement 918, and the output shaft 19. The planetary gear arrangement 918 includes three planetary gearsets 920, 930, and 940 and six torque-transmitting mechanisms 950, 952, 954, 956, 958, and 960. The torque-transmitting mechanism 960 is a stationary type torque-transmitting mechanism while the remaining torque-transmitting mechanisms are of the rotating type torque-transmitting mechanisms.

The planetary gearset 920 includes a sun gear member 922, a ring gear member 924, and a planet carrier assembly member 926. The planet carrier assembly member 926 includes a plurality of pinion gears 927 rotatably mounted on a planet carrier member 929 and disposed in meshing relationship with both the sun gear member 922 and the ring gear member 924.

The planetary gearset 930 includes a sun gear member 932, a ring gear member 934, and a planet carrier assembly member 936. The planet carrier assembly member 936 includes a plurality of pinion gears 937 rotatably mounted on a planet carrier member 939 and disposed in meshing relationship with both the sun gear member 932 and the ring gear member 934.

The planetary gearset 940 includes a sun gear member 942, a ring gear member 944, and a planet carrier assembly member 946. The planet carrier assembly member 946 includes a plurality of pinion gears 947 rotatably mounted on a planet carrier member 949 and disposed in meshing relationship with both the sun gear member 942 and the ring gear member 944.

The ring gear member 924 and planet carrier assembly member 936 are continuously interconnected by an interconnecting member 970, which is selectively connectible with the input shaft 17 through the torque-transmitting mechanism 952, and selectively connectible with the transmission housing 62 through the torque-transmitting mechanism 960. The sun gear member 922 and ring gear member 934 are continuously interconnected by an interconnecting member 972, which is selectively connectible with the input shaft 17 through the torque-transmitting mechanism 950. The sun gear members 932 and 942 are continuously interconnected by an interconnecting member 974, which is selectively connectible with the input shaft 17 through the torque-transmitting mechanism 954, and selectively connectible with the ring gear member 944 through the torque-transmitting mechanism 958. The planet carrier assembly member 946 is continuously connected with the transmission housing 62. The planet carrier assembly member 926 is continuously connected with the output shaft 19. The input shaft 17 is selectively connectible with the ring gear member 944 through the torque-transmitting mechanism 956.

The truth table shown in FIG. 20 describes the engagement sequence and combinations for the torque-transmitting mechanisms in order to establish seven forward speed ratios and one reverse speed ratio between the input shaft 17 and the output shaft 19 through the planetary gear arrangement 918. The truth table of FIG. 20 also provides a numerical example of possible speed ratios for the seven forward speed ratios and the reverse speed ratio when the ring gear/sun gear tooth ratios of the planetary gearsets 920, 930, and 940 are selected as shown in R1/S1, R2/S2, and R3/S3, respectively. Also given in FIG. 20 is a chart, which provides a numerical example for the ratio steps between adjacent forward speed ratios as well as between the reverse and first forward speed ratio. This chart also gives a numerical example for the overall ratio spread of the forward speed ratios.

Those skilled in the art will recognize that the reverse speed ratio, the fourth forward speed ratio, and the sixth forward speed ratio have numerical values determined by the ring gear/sun gear tooth ratios of the planetary gearsets 920 and 930. The first forward speed ratio, the third forward speed ratio, and the seventh forward speed ratio have numerical values determined by the ring gear/sun gear tooth ratios of all three planetary gearsets 920, 930, and 940. The second forward speed ratio has a numerical value determined by the ring gear/sun gear tooth ratio of the planetary gearset 920. The fifth forward speed ratio has a numerical value of one.

Figures 21, 22:
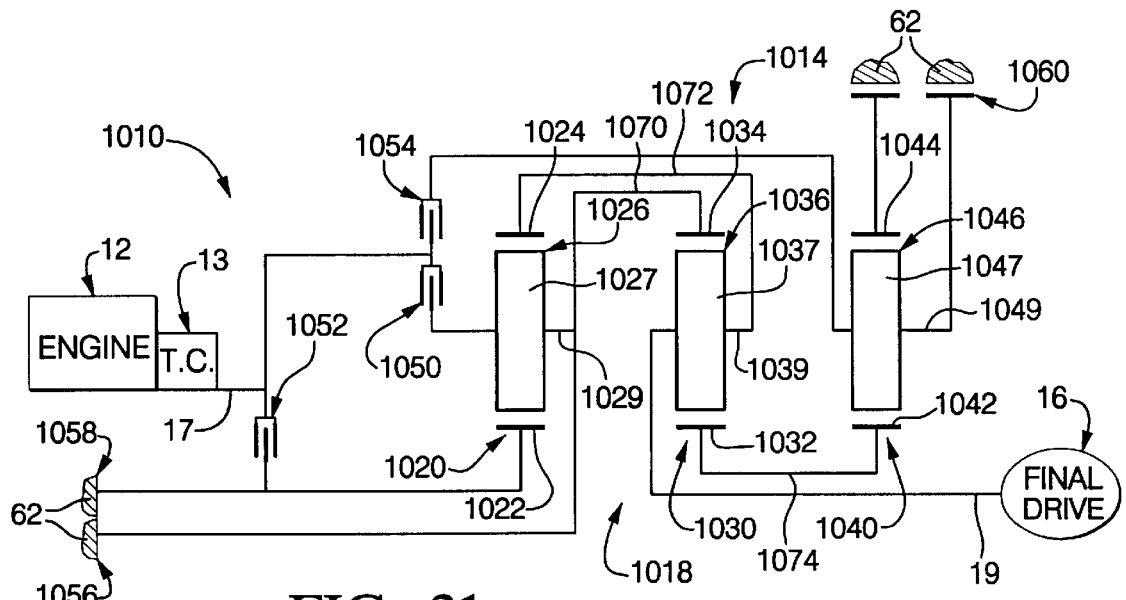
FIG. 21 is a schematic representation of a powertrain having another family transmission member of the present invention incorporated therein.
FIG. 22 is a truth table and chart depicting some of the operating parameters of the transmission shown in FIG. 21.

A powertrain 1010, shown in FIG. 21, includes the engine 12, the torque converter 13, a planetary transmission 1014, and the final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040 and six torque-transmitting mechanisms 1050, 1052, 1054, 1056, 1058, and 1060. The torque-transmitting mechanisms 1056, 1058, and 1060 are of the stationary type torque-transmitting mechanisms while the torque-transmitting mechanisms 1050, 1052, and 1054 are of the rotating type torque-transmitting mechanisms.

The planetary gearset 1020 includes a sun gear member 1022, a ring gear member 1024, and a planet carrier assembly member 1026. The planet carrier assembly member 1026 includes a plurality of pinion gears 1027 rotatably mounted on a planet carrier member 1029 and disposed in meshing relationship with both the sun gear member 1022 and the ring gear member 1024.

The planetary gearset 1030 includes a sun gear member 1032, a ring gear member 1034, and a planet carrier assembly member 1036. The planet carrier assembly member 1036 includes a plurality of pinion gears 1037 rotatably mounted on a planet carrier member 1039 and disposed in meshing relationship with both the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of pinion gears 1047 rotatably mounted on a planet carrier member 1049 and disposed in meshing relationship with both the sun gear member 1042 and the ring gear member 1044.

The planet carrier assembly member 1026 and the ring gear member 1034 are continuously interconnected by an interconnecting member 1070, which is selectively connectible with the input shaft 17 through the torque-transmitting mechanism 1050, and selectively connectible with the transmission housing 62 through the torque-transmitting mechanism 1056. The ring gear member 1024 and the planet carrier assembly member 1036 are continuously interconnected by an interconnecting member 1072, which is also continuously connected with the output shaft 19. The sun gear members 1032 and 1042 are continuously interconnected by an interconnecting member 1074. The ring gear member 1044 is continuously interconnected with the transmission housing 62. The sun gear member 1022 is selectively connectible with the input shaft 17 through the torque-transmitting mechanism 1052, and selectively connectible with the transmission housing 62 through the torque-transmitting mechanism 1058. The planet carrier assembly member 1046 is selectively connectible with the input shaft 17 through the torque-transmitting mechanism 1054, and selectively connectible with the transmission housing 62 through the torque-transmitting mechanism 1060.

The truth table shown in FIG. 22 describes the engagement sequence and combinations for the torque-transmitting mechanisms in order to establish seven forward speed ratios and one reverse speed ratio between the input shaft 17 and the output shaft 19 through the planetary gear arrangement 1018. Also given in the truth table of FIG. 22 is an example of the numerical values for the speed ratios that can be obtained with the planetary gear arrangement 1018. These numerical values are established by the ring gear/sun gear tooth ratios of the planetary gearsets 1020, 1030, and 1040, which are given in FIG. 22 as R1/S1, R2/S2, and R3/S3, respectively. Further information given in FIG. 22 is in the form of a chart in which the numerical values for the ratio steps between adjacent forward speed ratios as well as between the reverse and first forward speed ratio. Also given in the chart is the numerical value for the overall ratio spread of forward speed ratios.

By reviewing the engagement combinations and the schematic representation of the planetary gear arrangement 1018 in FIG. 21, those skilled in the art will recognize that the reverse speed ratio has a numerical value determined by the ring gear/sun gear tooth ratio of the planetary gearset 1020. The first forward speed ratio has a numerical value determined by the ring gear/sun gear tooth ratios of the planetary gearsets 1020 and 1030. The second forward speed ratio has a numerical value determined by the ring gear/sun gear tooth ratio of the planetary gearset 1030. The third forward speed ratio has a numerical value of one. The fourth forward speed ratio has a numerical value determined by the ring gear/sun gear tooth ratio of the planetary gearset 1020. The fifth forward speed ratio has a numerical value determined by the ring gear/sun gear tooth ratios of the planetary gearsets 1030 and 1040. The sixth and seventh forward speed ratios have numerical values determined by the ring gear/sun gear tooth ratios of all three planetary gearsets 1020, 1030, and 1040.

It is also evident from the truth table that each of the forward single step interchanges is of the single transition variety as well as the possibility of a single transition interchange from reverse to first forward speed ratio.

Figures 23, 24:
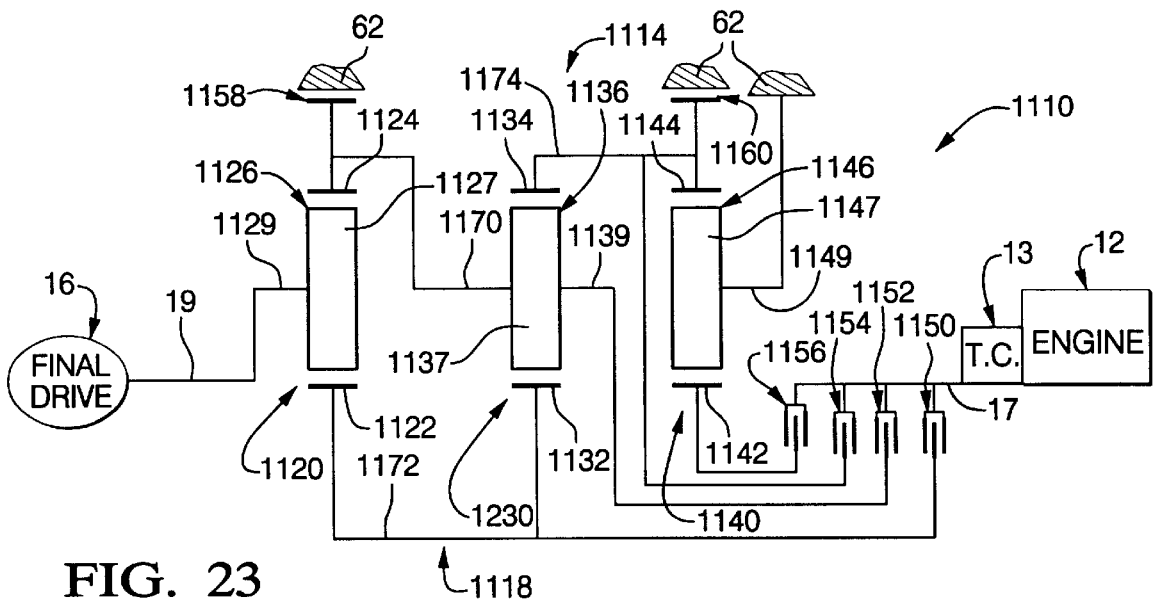
FIG. 23 is a schematic representation of a powertrain having another family transmission member of the present invention incorporated therein.
FIG. 24 is a truth table and chart depicting some of the operating parameters of the transmission shown in FIG. 23.

A powertrain 1110, shown in FIG. 23, includes the engine 12, the torque converter 13, a planetary transmission 1114, and the final drive mechanism 16. The planetary transmission 1114 includes the input shaft 17, a planetary gear arrangement 1118, and the output shaft 19. The planetary gear arrangement 1118 includes three planetary gearsets 1120, 1130, and 1140 and six torque-transmitting mechanisms 1150, 1152, 1154, 1156, 1158, and 1160. The torque-transmitting mechanisms 1158, and 1160 are of the stationary type torque-transmitting mechanisms while the torque-transmitting mechanisms 1150, 1152, 1154, and 1156 are of the rotating type torque-transmitting mechanisms.

The planetary gearset 1120 includes a sun gear member 1122, a ring gear member 1124, and a planet carrier assembly member 1126. The planet carrier assembly member 1126 includes a plurality of pinion gears 1127 rotatably mounted on a planet carrier member 1129 and disposed in meshing relationship with both the sun gear member 1122 and the ring gear member 1124.

The planetary gearset 1130 includes a sun gear member 1132, a ring gear member 1134, and a planet carrier assembly member 1136. The planet carrier assembly member 1136 includes a plurality of pinion gears 1137 rotatably mounted on a planet carrier member 1139 and disposed in meshing relationship with both the sun gear member 1132 and the ring gear member 1134.

The planetary gearset 1140 includes a sun gear member 1142, a ring gear member 1144, and a planet carrier assembly member 1146. The planet carrier assembly member 1146 includes a plurality of pinion gears 1147 rotatably mounted on a planet carrier member 1149 and disposed in meshing relationship with both the sun gear member 1142 and the ring gear member 1144.

The ring gear member 1124 and planet carrier assembly member 1136 are continuously interconnected by an interconnecting member 1170, which is selectively connectible with the input shaft 17 through the torque-transmitting mechanism 1152, and selectively connectible with the transmission housing 62 through the torque-transmitting mechanism 1158. The sun gear member 1122 and sun gear member 1132 are continuously interconnected by an interconnecting member 1172, which is selectively connectible with the input shaft 17 through the torque-transmitting mechanism 1150. The ring gear members 1134 and 1144 are continuously interconnected by an interconnecting member 1174, which is selectively connectible with the input shaft 17 through the torque-transmitting mechanism 1154, and selectively connectible with the transmission housing 62 through the torque-transmitting mechanism 1160. The planet carrier assembly member 1146 is continuously connected with the transmission housing 62. The planet carrier assembly member 1126 is continuously connected with the output shaft 19. The input shaft 17 is selectively connectible with the sun gear member 1142 through the torque-transmitting mechanism 1156.

The six torque-transmitting mechanisms 1150, 1152, 1154, 1156, 1158, and 1160 are selectively engaged in combinations of two, as shown in the truth table of FIG. 24, to establish seven forward speed ratios and one reverse speed ratio between the input shaft 17 and the output shaft 19 through the planetary gear arrangement 1118. The truth table of FIG. 24 also describes the sequence of these engagement combinations to provide the speed ratios. Further information given in the truth table is a numerical example of the speed ratios that can be obtained with the planetary gear arrangement 1118 when the ring gear/sun gear tooth ratios of the planetary gearsets 1120, 1130, and 1140 are as shown in FIG. 24 as R1/S1, R2/S2, and R3/S3, respectively. Also given in FIG. 24 by way of a chart are the ratio steps between adjacent forward speed ratios as well as between the reverse and first forward speed ratio. Further, the overall ratio spread is also presented in FIG. 24.

On reviewing the engagement combinations, those skilled in the art will recognize that the reverse speed ratio, the fourth forward speed ratio, and the sixth forward speed ratio have numerical values that are determined by the ring gear/sun gear tooth ratios of the planetary gearsets 1120 and 1130. The first forward speed ratio, the third forward speed ratio, and the seventh forward speed ratio have numerical values that are determined by the ring gear/sun gear tooth ratios of all three planetary gearsets 1120, 1130, and 1140. The second forward speed ratio has a numerical value determined by the ring gear/sun gear tooth ratio of the planetary gearset 1120. The fifth forward speed ratio has a numerical value of one.

As with the previously described family members, each of the forward single step interchanges is of the single transition variety.

Figures 25, 26:
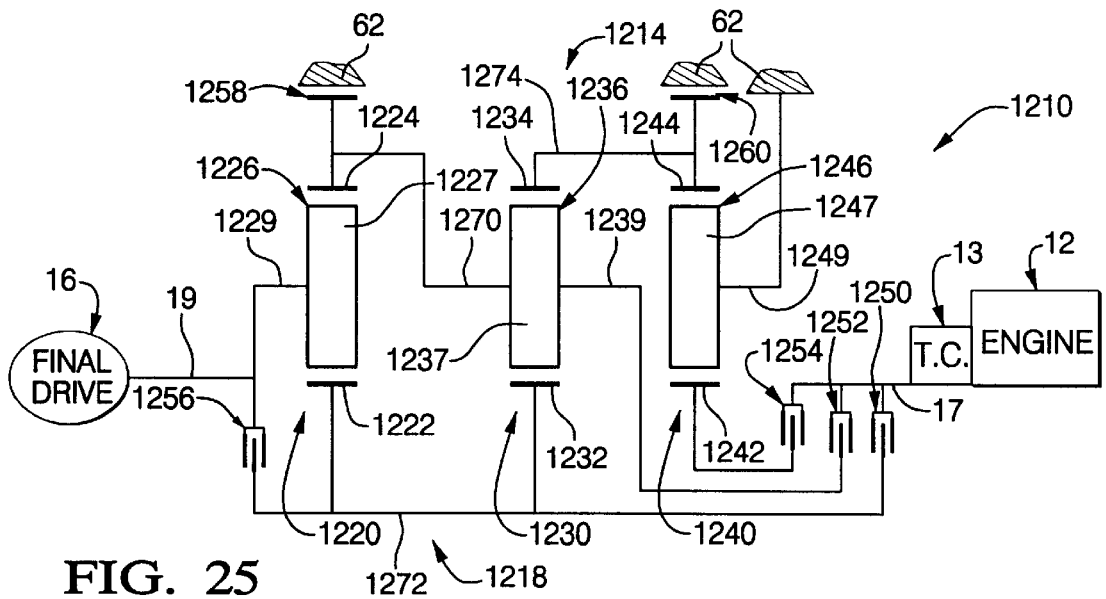
FIG. 25 is a schematic representation of a powertrain having another family transmission member of the present invention incorporated therein.
FIG. 26 is a truth table and chart depicting some of the operating parameters of the transmission shown in FIG. 25.

A powertrain 1210, shown in FIG. 25, includes the engine 12, the torque converter 13, a planetary transmission 1214, and the final drive mechanism 16. The planetary transmission 1214 includes the input shaft 17, a planetary gear arrangement 1218, and the output shaft 19. The planetary gear arrangement 1218 includes three planetary gearsets 1220, 1230, and 1240 and six torque-transmitting mechanisms 1250, 1252, 1254, 1256, 1258, and 1260. The torque-transmitting mechanisms 1258, and 1260 are of the stationary type torque-transmitting mechanisms while the torque-transmitting mechanisms 1250, 1252, 1254, and 1256 are of the rotating type torque-transmitting mechanisms.

The planetary gearset 1220 includes a sun gear member 1222, a ring gear member 1224, and a planet carrier assembly member 1226. The planet carrier assembly member 1226 includes a plurality of pinion gears 1227 rotatably mounted on a planet carrier member 1229 and disposed in meshing relationship with both the sun gear member 1222 and the ring gear member 1224.

The planetary gearset 1230 includes a sun gear member 1232, a ring gear member 1234, and a planet carrier assembly member 1236. The planet carrier assembly member 1236 includes a plurality of pinion gears 1237 rotatably mounted on a planet carrier member 1239 and disposed in meshing relationship with both the sun gear member 1232 and the ring gear member 1234.

The planetary gearset 1240 includes a sun gear member 1242, a ring gear member 1244, and a planet carrier assembly member 1246. The planet carrier assembly member 1246 includes a plurality of pinion gears 1247 rotatably mounted on a planet carrier member 1249 and disposed in meshing relationship with both the sun gear member 1242 and the ring gear member 1244.

The ring gear member 1224 and planet carrier assembly member 1236 are continuously interconnected by an interconnecting member 1270, which is selectively connectible with the input shaft 17 through the torque-transmitting mechanism 1252, and selectively connectible with the transmission housing 62 through the torque-transmitting mechanism 1258. The sun gear members 1222 and 1232 are continuously interconnected by an interconnecting member 1272, which is selectively connectible with the input shaft 17 through the torque-transmitting mechanism 1250, and selectively connectible with the output shaft 19 through the torque-transmitting mechanism 1256. The ring gear members 1234 and 1244 are continuously interconnected by an interconnecting member 1274, which is selectively connectible with the transmission housing 62 through the torque-transmitting mechanism 1260. The planet carrier assembly member 1246 is continuously connected with the transmission housing 62. The planet carrier assembly member 1226 is continuously connected with the output shaft 19. The input shaft 17 is selectively connectible with the sun gear member 1242 through the torque-transmitting mechanism 1254.

The torque-transmitting mechanisms are selectively engaged in combinations of two as shown in the truth table of FIG. 26. The truth table also describes the sequence of these engagements. Further information given in the truth table is a numerical example for each of the forward speed ratios that are possible with the planetary gear arrangement 1218 when the ring gear/sun gear tooth ratios of the planetary gearsets 1220, 1230, and 1240 are as described in FIG. 26 as R1/S1, R2/S2, and R3/S3, respectively. A chart in FIG. 26 gives the numerical values for the ratio steps between adjacent forward speed ratios as well as between the reverse and first forward speed ratio. The chart also gives the numerical example of the ratio spread of the forward speed ratios.

Those skilled in the art, upon reviewing the engagement combinations shown in the truth table, will recognize that the reverse speed ratio has a numerical value determined by the ring gear/sun gear tooth ratio of the planetary gearset 1240. The first forward speed ratio, the third forward speed ratio, and the seventh forward speed ratio have numerical values determined by the ring gear/sun gear tooth ratios of all three planetary gearsets 1220, 1230, and 1240. The second forward speed ratio has a numerical value determined by the ring gear/sun gear tooth ratio of the planetary gearset 1220. The fourth and sixth forward speed ratios have numerical values determined by the ring gear/sun gear tooth ratios of the planetary gearsets 1220 and 1230. The fifth forward speed ratio has a numerical value of one.

The transmission 1214, shown in FIG. 25, provides for single transition interchanges between the single step forward ratio interchanges as has been described for the previous family members.

Figures 27, 28:
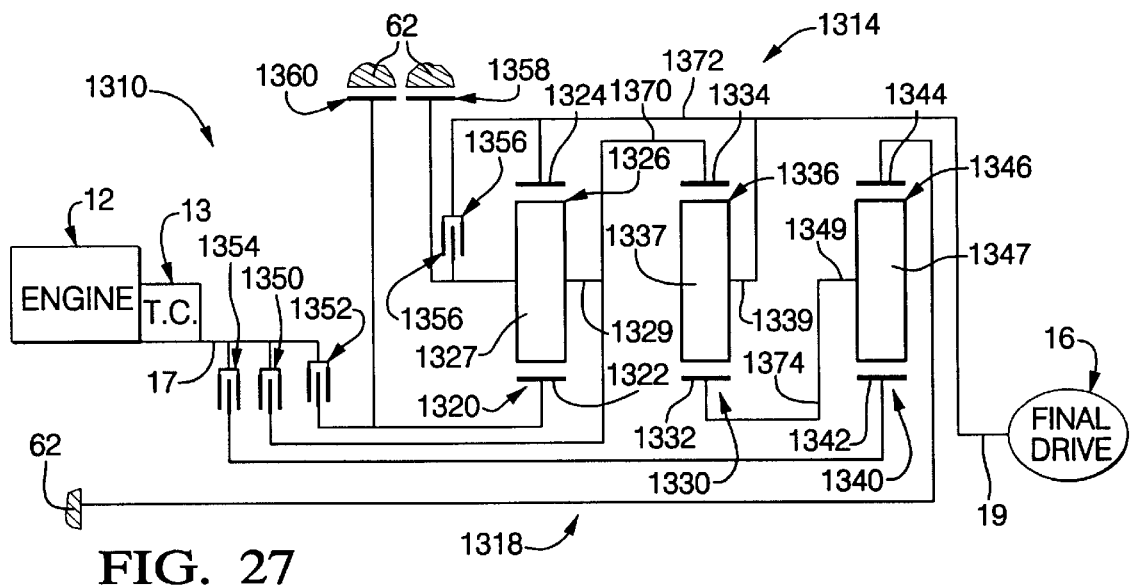
FIG. 27 is a schematic representation of a powertrain having another family transmission member of the present invention incorporated therein.
FIG. 28 is a truth table and chart depicting some of the operating parameters of the transmission shown in FIG. 27.

A powertrain 1310, shown in FIG. 27, includes the engine 12, the torque converter 13, a planetary transmission 1314, and the final drive mechanism 16. The planetary transmission 1314 includes the input shaft 17, a planetary gear arrangement 1318, and the output shaft 19. The planetary gear arrangement 1318 includes three planetary gearsets 1320, 1330, and 1340 and six torque-transmitting mechanisms 1350, 1352, 1354, 1356, 1358, and 1360. The torque-transmitting mechanisms 1358, and 1360 are of the stationary type torque-transmitting mechanisms while the torque-transmitting mechanisms 1350, 1352, 1354, and 1356 are of the rotating type torque-transmitting mechanisms.

The planetary gearset 1320 includes a sun gear member 1322, a ring gear member 1324, and a planet carrier assembly member 1326. The planet carrier assembly member 1326 includes a plurality of pinion gears 1327 rotatably mounted on a planet carrier member 1329 and disposed in meshing relationship with both the sun gear member 1322 and the ring gear member 1324.

The planetary gearset 1330 includes a sun gear member 1332, a ring gear member 1334, and a planet carrier assembly member 1336. The planet carrier assembly member 1336 includes a plurality of pinion gears 1337 rotatably mounted on a planet carrier member 1339 and disposed in meshing relationship with both the sun gear member 1332 and the ring gear member 1334.

The planetary gearset 1340 includes a sun gear member 1342, a ring gear member 1344, and a planet carrier assembly member 1346. The planet carrier assembly member 1346 includes a plurality of pinion gears 1347 rotatably mounted on a planet carrier member 1349 and disposed in meshing relationship with both the sun gear member 1342 and the ring gear member 1344.

The planet carrier assembly member 1326 and the ring gear member 1334 are continuously interconnected by an interconnecting member 1370, which is selectively connectible with the input shaft 17 through the torque-transmitting mechanism 1350, and selectively connectible with the transmission housing 62 through the torque-transmitting mechanism 1358. The ring gear member 1324 and planet carrier assembly member 1336 are continuously interconnected by an interconnecting member 1372, which is selectively connectible with the interconnecting member 1370 through the torque-transmitting mechanism 1356, and continuously connected with the output shaft 19. The sun gear member 1332 and planet carrier assembly member 1346 are continuously interconnected by an interconnecting member 1374. The input shaft 17 is selectively connectible with the sun gear member 1342 through the torque-transmitting mechanism 1354, and selectively connectible with the sun gear member 1322 through the torque-transmitting mechanism 1352. The sun gear member 1322 is selectively connectible with the transmission housing 62 through the torque-transmitting mechanism 1360.

The truth table shown in FIG. 28 depicts the combination of engagements for the torque-transmitting mechanisms, as well as the sequence of engagement, in order to establish seven forward speed ratios and one reverse speed ratio in the planetary gear arrangement 1318 between the input shaft 17 and the output shaft 19. The truth table also provides a numerical example of the seven forward speed ratios and the reverse speed ratio. These numerical examples are obtained by utilizing the ring gear/sun gear tooth ratios of the planetary gearsets 1320, 1330, and 1340 as shown in FIG. 28 as R1/S1, R2/S2, and R3/S3, respectively. Further information given in FIG. 28 in the form of a chart in which is given the numerical values of the ratio steps between adjacent forward speed ratios as well as between the reverse and first forward speed ratio. Also given in the chart is the numerical example of the overall ratio spread of the forward speed ratios.

Upon reviewing the truth table, and the combination of engagements found therein, those skilled in the art will recognize that the reverse speed ratio and the seventh forward speed ratio have numerical values determined by the ring gear/sun gear tooth ratio of the planetary gearset 1320. The first forward speed ratio and the fifth forward speed ratio have numerical values determined by the ring gear/sun gear tooth ratios of the planetary gearsets 1330 and 1340. The second forward speed ratio and the fourth forward speed ratio have numerical values determined by the ring gear/sun gear tooth ratios of all three planetary gearsets 1320, 1330, and 1340. The numerical value of the third forward speed ratio is determined by the ring gear/sun gear tooth ratio of the planetary gearset 1340. The sixth forward speed ratio has a numerical value of one.

Each of the single step forward interchanges is of the single transition variety and it is possible to have a single transition interchange from reverse to first forward.

Figures 29, 30:
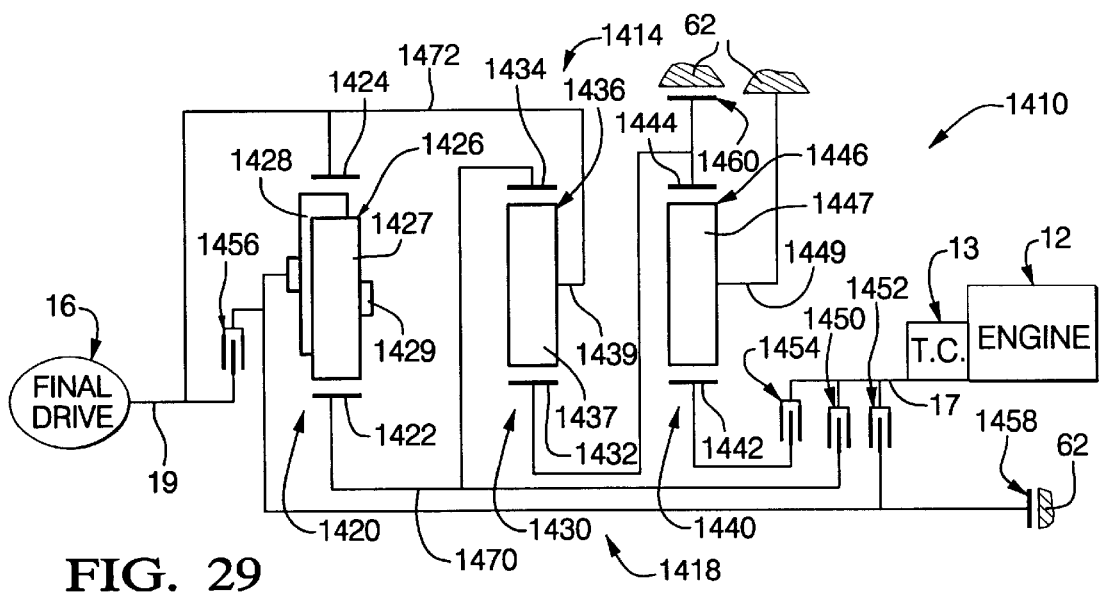
FIG. 29 is a schematic representation of a powertrain having another family transmission member of the present invention incorporated therein.
FIG. 30 is a truth table and chart depicting some of the operating parameters of the transmission shown in FIG. 29.

A powertrain 1410, shown in FIG. 29, includes the engine 12, the torque converter 13, a planetary transmission 1414, and the final drive mechanism 16. The planetary transmission 1414 includes the input shaft 17, a planetary gear arrangement 1418, and the output shaft 19. The planetary gear arrangement 1318 includes three planetary gearsets 1420, 1430, and 1440 and six torque-transmitting mechanisms 1450, 1452, 1454, 1456, 1458, and 1460. The torque-transmitting mechanisms 1458, and 1460 are of the stationary type torque-transmitting mechanisms while the torque-transmitting mechanisms 1350, 1352, 1354, and 1356 are of the rotating type torque-transmitting mechanisms.

The planetary gearset 1420 includes a sun gear member 1422, a ring gear member 1424, and a planet carrier assembly member 1426. The planet carrier assembly member 1426 includes a plurality of pairs of meshing pinion gears 1427 and 1428 that are rotatably mounted on a planet carrier member 1429 and disposed in meshing relationship with both the sun gear member 1422 and the ring gear member 1424. The planetary gearset 1420 is commonly termed a dual pinion or compound planetary. In this type of planetary, it is well known that if the planet carrier 1429 is held stationary, the sun gear member 1422 and ring gear member 1424 will rotate in the same direction.

The planetary gearset 1430 includes a sun gear member 1432, a ring gear member 1434, and a planet carrier assembly member 1436. The planet carrier assembly member 1436 includes a plurality of pinion gears 1437 rotatably mounted on a planet carrier member 1439 and disposed in meshing relationship with both the sun gear member 1432 and the ring gear member 1434.

The planetary gearset 1440 includes a sun gear member 1442, a ring gear member 1444, and a planet carrier assembly member 1446. The planet carrier assembly member 1446 includes a plurality of pinion gears 1447 rotatably mounted on a planet carrier member 1449 and disposed in meshing relationship with both the sun gear member 1442 and the ring gear member 1444.

The sun gear member 1422 and ring gear member 1434 are continuously interconnected by an interconnecting member 1470, which is selectively connectible with the input shaft 17 through the torque-transmitting mechanism 1450. The ring gear member 1424 and planet carrier assembly member 1436 are continuously interconnected by an interconnecting member 1472, which is continuously connected with the output shaft 19. The sun gear member 1432 and ring gear member 1444 are continuously interconnected by an interconnecting member 1474, which is selectively connectible with the transmission housing 62 through the torque-transmitting mechanism 1460. The planet carrier assembly member 1446 is continuously connected with the transmission housing 62. The input shaft 17 is selectively connectible with the planet carrier assembly member 1426 through the torque-transmitting mechanism 1452, and selectively connectible with the sun gear member 1442 through the torque-transmitting mechanism 1454. The planet carrier assembly member 1426 is selectively connectible with the output shaft 19 through the torque-transmitting mechanism 1456, and selectively connectible with the transmission housing 62 through the torque-transmitting mechanism 1458.

The truth table shown in FIG. 30 provides the engagement combinations for the torque-transmitting mechanisms 1450, 1452, 1454, 1456, 1458, and 1460 in order to establish seven forward speed ratios and one reverse speed ratio within the planetary gear arrangement 1418 between the input shaft 17 and the output shaft 19. The truth table also provides the sequence of the combinations of engagement, which provide the seven forward speed ratios and one reverse speed ratio. Further information given in the truth table is a numerical example of speed ratios that are available with the planetary gear arrangement 1418. These numerical speed ratios are determined by the ring gear/sun gear tooth ratios of the planetary gearsets 1420, 1430, and 1440 as given in FIG. 30 as R1/S1, R2/S2, and R3/S3, respectively. A chart in FIG. 30 provides the numerical example for the ratio steps between adjacent forward speed ratios as well as between the reverse and first forward speed ratio. This chart also provides the numerical example for the overall ratio spread of the forward speed ratios.

Those skilled in the art, upon reviewing the combinations of engagements shown in the truth table, will recognize that the numerical value for the reverse speed ratio is determined by the ring gear/sun gear tooth ratio of the planetary gearset 1440. The first forward speed ratio and the seventh forward speed ratio have numerical values determined by the ring gear/sun gear tooth ratios of all three planetary gearsets 1420, 1430, and 1440. The second forward speed ratio has a numerical value determined by the ring gear/sun gear tooth ratio of the planetary gearset 1420. The third forward speed ratio has a numerical value determined by the ring gear/sun gear tooth ratios of the planetary gearsets 1430 and 1440. The fourth forward speed ratio has a numerical value determined by the ring gear/sun gear tooth ratio of the planetary gearset 1430. The fifth forward speed ratio has a numerical value of one. The sixth forward speed ratio has a numerical value determined by the ring gear/sun gear tooth ratios of the planetary gearsets 1420 and 1430.

As with the previously described family members, the family member shown in the planetary gear arrangement 1418 provides for single transition interchanges on single step ratio changes in the forward direction.

Figures 31, 32:
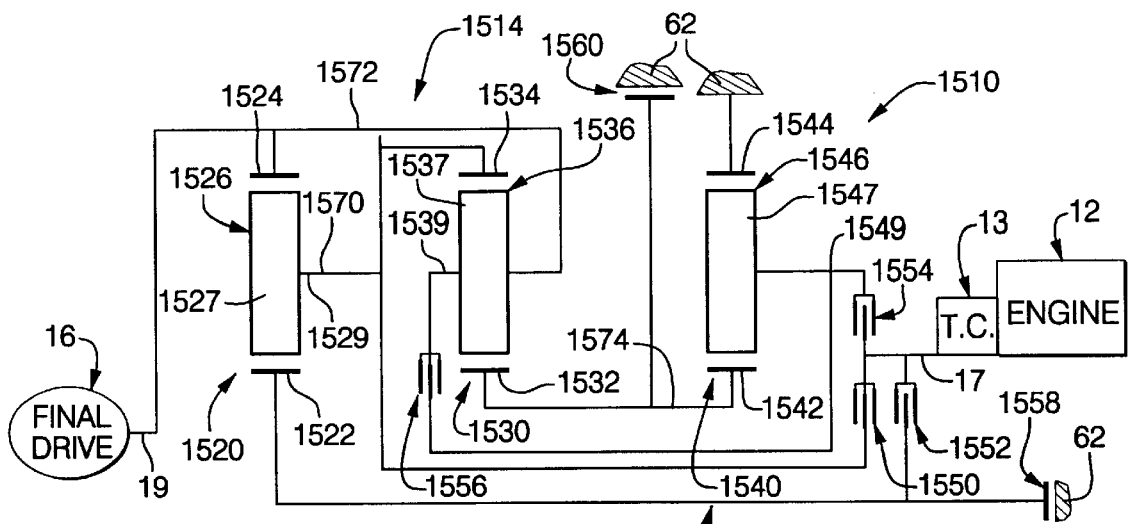
FIG. 31 is a schematic representation of a powertrain having another family transmission member of the present invention incorporated therein.
FIG. 32 is a truth table and chart depicting some of the operating parameters of the transmission shown in FIG. 31.

A powertrain 1510, shown in FIG. 31, includes the engine 12, the torque converter 13, a planetary transmission 1514, and the final drive mechanism 16. The planetary transmission 1514 includes the input shaft 17, a planetary gear arrangement 1518, and the output shaft 19. The planetary gear arrangement 1518 includes three planetary gearsets 1520, 1530, and 1540 and six torque-transmitting mechanisms 1550, 1552, 1554, 1556, 1558, and 1560. The torque-transmitting mechanisms 1558, and 1560 are of the stationary type torque-transmitting mechanisms while the torque-transmitting mechanisms 1550, 1552, 1554, and 1556 are of the rotating type torque-transmitting mechanisms.

The planetary gearset 1520 includes a sun gear member 1522, a ring gear member 1524, and a planet carrier assembly member 1526. The planet carrier assembly member 1526 includes a plurality of pinion gears 1527 rotatably mounted on a planet carrier member 1529 and disposed in meshing relationship with both the sun gear member 1522 and the ring gear member 1524.

The planetary gearset 1530 includes a sun gear member 1532, a ring gear member 1534, and a planet carrier assembly member 1536. The planet carrier assembly member 1536 includes a plurality of pinion gears 1537 rotatably mounted on a planet carrier member 1539 and disposed in meshing relationship with both the sun gear member 1532 and the ring gear member 1534.

The planetary gearset 1540 includes a sun gear member 1542, a ring gear member 1544, and a planet carrier assembly member 1546. The planet carrier assembly member 1546 includes a plurality of pinion gears 1547 rotatably mounted on a planet carrier member 1549 and disposed in meshing relationship with both the sun gear member 1542 and the ring gear member 1544.

The planet carrier assembly member 1526 and ring gear member 1534 are continuously interconnected by an interconnecting member 1570, and selectively connectible with the input shaft 17 through the torque-transmitting mechanism 1550. The ring gear member 1524 and planet carrier assembly member 1536 are continuously interconnected by an interconnecting member 1572, which is continuously interconnected with the output shaft 19, and selectively connectible with the planet carrier assembly member 1546 through the torque-transmitting mechanism 1556. The sun gear members 1532 and 1542 are continuously interconnected by an interconnecting member 1574, which is selectively connectible with the transmission housing 62 through the torque-transmitting mechanism 1560. The planet carrier assembly member 1546 is selectively connectible with the input shaft 17 through the torque-transmitting mechanism 1554. The sun gear member 1522 is selectively connectible with the input shaft 17 through the torque-transmitting mechanism 1552, and selectively connectible with the transmission housing 62 through the torque-transmitting mechanism 1558.

The truth table shown in FIG. 32 provides a pictorial representation of the engagement combinations for the torque-transmitting mechanisms 1550, 1552, 1554, 1556, 1558, and 1560 in order to establish seven forward speed ratios and one reverse speed ratio in the planetary gear arrangement 1518 between the input shaft 17 and the output shaft 19. The truth table also describes the engagement sequence for these speed ratios. Further information given in the truth table is an example of the numerical values that can be obtained with the planetary gear arrangement 1518 when the ring gear/sun gear tooth ratios of the planetary gearsets 1520, 1530, and 1540 are represented in FIG. 32 as R1/S1, R2/S2, and R3/S3, respectively. Also given in FIG. 32 is a chart, which represents the numerical values for the ratio steps between adjacent forward speed ratios as well as between the reverse and first forward speed ratio and the overall ratio spread for the forward speed ratios.

Upon reviewing the engagement combinations shown in FIG. 31, those skilled in the art will recognize that the numerical values for the reverse speed ratio, the sixth forward speed ratio, and the seventh forward speed ratio are determined by the ring gear/sun gear tooth ratios of all three planetary gearsets 1520, 1530, and 1540. The numerical value for the first forward speed ratio is determined by the ring gear/sun gear tooth ratios of the planetary gearsets 1520 and 1530. The numerical value for the second forward speed ratio is determined by the ring gear/sun gear tooth ratio of the planetary gearset 1530. The third forward speed ratio has a numerical value of one. The fourth forward speed ratio has a numerical value determined by the ring gear/sun gear tooth ratio of the planetary gearset 1520. The fifth forward speed ratio has a numerical value determined by the ring gear/sun gear tooth ratios of the planetary gearsets 1530 and 1540.

Also upon reviewing the truth table, those skilled in the art will recognize that each of the single step forward interchanges are of the single transition variety as is the reverse to first forward speed ratio when the torque-transmitting mechanism 1552 remains engaged in the neutral condition.

Figures 33, 34:
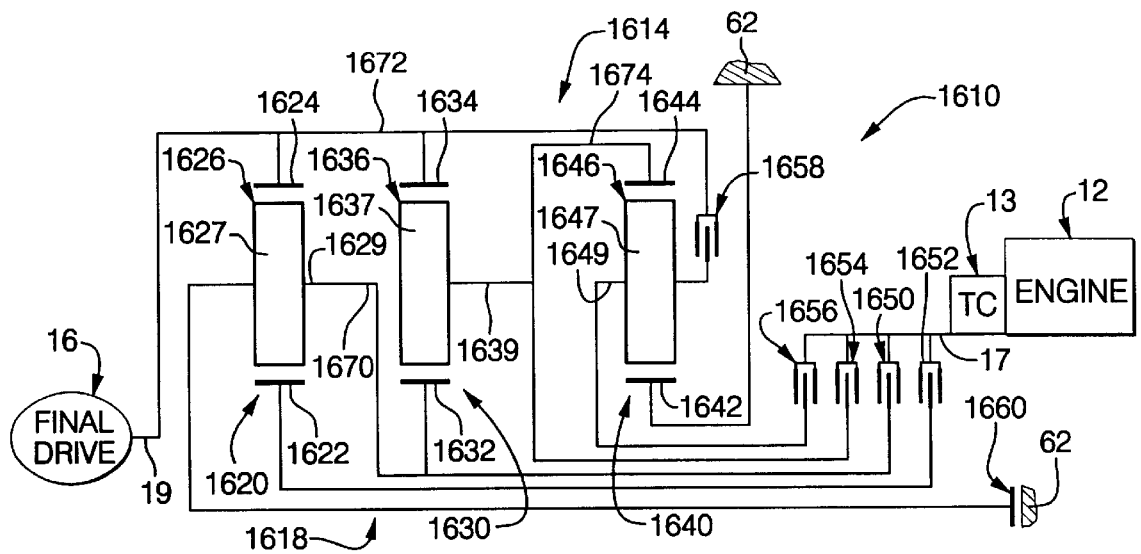
FIG. 33 is a schematic representation of a powertrain having another family transmission member of the present invention incorporated therein.
FIG. 34 is a truth table and chart depicting some of the operating parameters of the transmission shown in FIG. 33.

A powertrain 1610, shown in FIG. 33, includes the engine 12, the torque converter 13, a planetary transmission 1614, and the final drive mechanism 16. The planetary transmission 1614 includes the input shaft 17, a planetary gear arrangement 1618, and the output shaft 19. The planetary gear arrangement 1618 includes three planetary gearsets 1620, 1630, and 1640 and six torque-transmitting mechanisms 1650, 1652, 1654, 1656, 1658, and 1660. The torque-transmitting mechanism 1560 is of the stationary type torque-transmitting mechanisms while the remaining torque-transmitting mechanisms are of the rotating type torque-transmitting mechanisms.

The planetary gearset 1620 includes a sun gear member 1622, a ring gear member 1624, and a planet carrier assembly member 1626. The planet carrier assembly member 1626 includes a plurality of pinion gears 1627 rotatably mounted on a planet carrier member 1629 and disposed in meshing relationship with both the sun gear member 1622 and the ring gear member 1624.

The planetary gearset 1630 includes a sun gear member 1632, a ring gear member 1634, and a planet carrier assembly member 1636. The planet carrier assembly member 1636 includes a plurality of pinion gears 1637 rotatably mounted on a planet carrier member 1639 and disposed in meshing relationship with both the sun gear member 1632 and the ring gear member 1634.

The planetary gearset 1640 includes a sun gear member 1642, a ring gear member 1644, and a planet carrier assembly member 1646. The planet carrier assembly member 1646 includes a plurality of pinion gears 1647 rotatably mounted on a planet carrier member 1649 and disposed in meshing relationship with both the sun gear member 1642 and the ring gear member 1644.

The truth table shown in FIG. 34 provides a pictorial representation of the engagement combinations for the torque-transmitting mechanisms 1650, 1652, 1654, 1656, 1658, and 1660 in order to establish seven forward speed ratios and one reverse speed ratio in the planetary gear arrangement 1618 between the input shaft 17 and the output shaft 19. The truth table also provides a pictorial representation of the sequence of these engagement combinations. Further information given in the truth table is a numerical example of the forward speed ratios and reverse speed ratio that are available in the planetary gear arrangement 1618. These numerical examples determined utilizing the ring gear/sun gear tooth ratios of the planetary gearsets 1620, 1630, and 1640 when these ring gear/sun gear tooth ratios are equal to the ratios R1/S1, R2/S2, and R3/S3, respectively. Also given in FIG. 34 is a chart, which provides the numerical values for the ratio steps between the single forward speed ratios as well as between the reverse and first forward speed ratio. Further information given in the chart is the numerical value for the overall ratio spread of the forward speed ratios.

Upon reviewing the combination of engagements in the truth table, those skilled in the art will recognize that the numerical value for the reverse speed ratio is determined by the ring gear/sun gear tooth ratio of the planetary gearset 1620. The numerical values for the first forward speed ratio and the fifth forward speed ratio are determined by the ring gear/sun gear tooth ratios of all three planetary gearsets 1620, 1630, and 1640. The numerical values for the second forward speed ratio, the sixth forward speed ratio, and the seventh forward speed ratio are determined by the ring gear/sun gear tooth ratios of the planetary gearsets 1630 and 1640. The third forward speed ratio has a numerical value determined by the ring gear/sun gear tooth ratio of the planetary gearset 1640. The fourth forward speed ratio has a numerical value of one.

Also upon reviewing the engagement combinations and sequence shown in the truth table, those skilled in the art will recognize that each of the single step forward interchanges is of the single transition variety. Also the reverse to first forward speed ratio can be made with a torque-transmitting mechanism swap as long as the torque-transmitting mechanism 1652 remains engaged through the neutral condition.

It should now be evident that each of the family members of the present invention includes three planetary gearsets wherein each planetary gearset has three members including a sun gear member, a ring gear member, and a planet carrier assembly member. It should also be apparent that a first and second of the planetary gearsets have two interconnected members, while the second and third planetary gearsets have one interconnected member. Thus, the second planetary gearset has all three members interconnected to at least one other planetary gear member. It should also be apparent that the output shaft of the transmission is continuously interconnected with at least one planetary gear member and that at least one planetary gear member of the third planetary gearset is continuously connected with the transmission housing.

It should be apparent that modifications and variations are possible in the family members that are not depicted in the above-described embodiments. Therefore, the invention should only be limited by the appended claims.

What is claimed is:

1. A transmission comprising:
   an input shaft;
   an output shaft;
   a transmission housing;
   a first planetary gearset having first, second and third planetary members;
   a second planetary gearset having first, second and third planetary members;
   a third planetary gearset having first, second and third planetary members;
   a first interconnecting member continuously interconnecting a first member of said first planetary gearset with said first member of said second planetary gearset;

a second interconnecting member continuously interconnecting a second member of said first planetary gearset with a second member of said second planetary gearset;

a third interconnecting member continuously interconnecting a third member of said second planetary gearset with a first member of said third planetary gearset;

a second member of said third planetary gearset being continuously connected with said transmission housing;

said output shaft being continuously connected with at least one member of one of said planetary gearsets; said input shaft being interconnected with members of said planetary gearsets only through individually-operated selectively-engageable torque transmitting mechanisms; and six selectively engageable torque-transmitting mechanisms being engaged in combinations of two to establish at least seven forward speed ratios and one reverse speed ratio between said input shaft and said output shaft through said planetary gearsets with either the first of said torque-transmitting mechanisms selectively interconnecting said input shaft with said first interconnecting member, the second of said torque transmitting mechanisms selectively interconnecting said input shaft with said third member of said first planetary gearset, the third of said torque transmitting mechanisms selectively interconnecting said impute shaft with said third interconnecting member, the fourth of said torque transmitting mechanisms selectively interconnecting said input shaft with said third member of said third planetary gearset, the fifth of said torque transmitting mechanisms selectively interconnecting said first interconnecting member with said transmission housing, and the sixth of said torque transmitting mechanisms selectively interconnecting said third interconnecting member with said transmission housing, or said first torque-transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said third member of said third planetary gearset with said first interconnecting member, said fifth torque-transmitting mechanism selectively interconnecting said first interconnecting member with said transmission housing, said sixth torque-transmitting mechanism selectively interconnecting said transmission housing with said third interconnecting member, or said first torque-transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said first interconnecting member with said output shaft said fifth torque-transmitting mechanism selectively interconnecting said transmission housing with said interconnecting member ad said sixth torque-transmitting mechanism selectively interconnecting said transmission housing with said third interconnecting member, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said third interconnecting member, said fourth torque-transmitting mechanism selectively interconnecting said input shaft with said third member of said third planetary gearset, said fifth torque-transmitting mechanism selectively interconnecting said transmission housing with said first interconnecting member said sixth torque-transmitting mechanism selectively interconnecting said transmission housing with said third interconnecting member, or said first torque-transmitting mechanism selectively interconnecting said input shaft with said first interconnecting member, said second torque-transmitting mechanism selectively interconnecting said input shaft with said second interconnecting member said third torque-transmitting mechanism selectively interconnecting said input shaft with said third interconnecting member, said fourth torque-transmitting selectively interconnecting said input shaft with said third member of said third planetary gearset said fifth torque-transmitting mechanism selectively interconnecting said third member of said third planetary gearset with said third interconnecting member and said sixth torque-transmitting mechanism selectively interconnecting said transmission housing with said first interconnecting member, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said third member of said third planetary gearset, said fourth torque-transmitting mechanism selectively interconnecting said first interconnecting member with said output shaft, said fifth torque-transmitting mechanism selectively interconnecting said third member of said third planetary gearset with said third interconnecting member, and said sixth torque-transmitting mechanism selectively interconnecting said transmission housing with said first interconnecting member, or said first torque-transmitting mechanism selectively interconnecting said input shaft with said first interconnecting member said second torque-transmitting mechanism selectively interconnecting said input shaft with said third member of said first planetary gearset, said third torque-transmitting mechanism selectively interconnecting said input shaft with said third member of said third planetary gearset said fourth torque-transmitting mechanism selectively interconnecting said third member of said third planetary gearset with said first interconnecting member, said fifth torque-transmitting with said third interconnecting member, and said sixth torque-transmitting mechanism selectively interconnecting said transmission housing with said first interconnecting member, or said first torque-transmitting mechanism selectively interconnecting said input shaft with said first interconnecting member, said second torque-transmitting mechanism selectively interconnecting said input shall with said third member of said first planetary gearset, said third torque-transmitting mechanism selectively interconnecting said input shaft with said third interconnecting member, said fourth torque-transmitting mechanism selectively interconnecting said input shaft with said third member of said third planetary gearset, said fifth torque-transmitting mechanism selectively interconnecting said third member of said third planetary gearset with said third interconnecting member, and said sixth torque-transmitting mechanism selectively interconnecting transmission housing with said first interconnecting member, or said first torque-transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said first interconnecting member with said output shaft, said fifth torque-transmitting mechanism selectively interconnecting said third member of said third planetary gearset with said third interconnecting member, and said sixth torque-transmitting mechanism selectively interconnecting said transmission housing with said first interconnecting member, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said third interconnecting member, said fourth torque-transmitting mechanism selectively interconnecting said input shy with said third member of said third planetary gearset said fifth torque-transmitting mechanism selectively interconnecting said third member of said third planetary gearset with said third interconnecting member, and said sixth torque-transmitting mechanism selectively interconnecting said transmission housing with said first interconnecting member, or said first torque-transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said fifth torque-transmitting mechanism selectively interconnecting said transmission housing with said third member of said first planetary gearset and said sixth torque-transmitting mechanism selectively interconnecting said transmission housing with said third member of said third planetary gearset, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said interconnecting said input shaft with said fifth torque-transmitting mechanism selectively interconnecting said transmission housing with said first interconnecting member, and said sixth torque-transmitting mechanism selectively interconnecting said transmission housing with said third interconnecting member, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said third member of said third planetary gearset, said fourth torque-transmitting mechanism selectively interconnecting said second interconnecting member with said output shaft, said fifth torque-transmitting mechanism selectively interconnecting said transmission housing with said first interconnecting member, and said sixth torque-transmitting mechanism selectively interconnecting said transmission housing with said third interconnecting member, or said first torque-transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said first interconnecting member with said second interconnecting member, said fifth torque-transmitting mechanism selectively interconnecting said transmission housing with said first interconnecting member, and said sixth torque-transmitting mechanism selectively interconnecting said transmission housing with said third member of said first planetary gearset, or said first torque-transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said third member of said first planetary gearset with said output shaft, said fifth torque-transmitting mechanism selectively interconnecting said transmission housing with said third member of said first planetary gearset and said sixth torque-transmitting mechanism selectively interconnecting said transmission housing with said third interconnecting member, or said first torque-transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said third member of said third planetary gearset with said second interconnecting member, said fifth torque-transmitting mechanism selectively interconnecting said transmission housing with said third member of said first planetary gearset, and said sixth torque-transmitting mechanism selectively interconnecting said transmission housing with said third interconnecting member, or said first torque-transmitting mechanism selectively interconnecting said input shaft with said first interconnecting member said second of said torque-transmitting mechanism selectively interconnecting said input shaft with said third member of said first planetary gearset, said third torque-transmitting mechanism selectively interconnecting said input shaft with said third interconnecting member, said fourth torque-transmitting mechanism selectively interconnecting said input shaft with said third member of said third planetary gearset, said fifth torque-transmitting mechanism selectively interconnecting said 3-2 with said second interconnecting member, and said sixth torque-transmitting mechanism selectively interconnecting said transmission housing with said first interconnecting member.

2. A power transmission comprising:

an input shaft;

an output shaft;

a transmission housing;

a first planetary gearset having first, second and third planetary members;

a second planetary gearset having first, second and third planetary members;

a third planetary gearset having first, second and third planetary members;

a first interconnecting member continuously interconnecting a first member of said first planetary gearset with said first member of said second planetary gearset;

a second interconnecting member continuously interconnecting a second member of said first planetary gearset with a second member of said second planetary gearset;

a third interconnecting member continuously interconnecting a third member of said second planetary gearset with a first member of said third planetary gearset;

a second member of said third planetary gearset being continuously connected with said transmission housing;

said output shaft being continuously interconnected with either said second interconnecting member or said third member of said first planetary gearset; and six torque transmitting mechanisms selectively engageable in combinations of two to establish at least seven forward speed ratios and one reverse speed ratio.

3. A power transmission comprising:

an input shaft;

an output shaft;

a transmission housing;

a first planetary gearset having first, second and third planetary members;

a second planetary gearset having first, second and third planetary members;

a third planetary gearset having first, second and third planetary members;

a first interconnecting member continuously interconnecting a first member of said first planetary gearset with said first member of said second planetary gearset;

a second interconnecting member continuously interconnecting a second member of said first planetary gearset with a second member of said second planetary gearset;

a third interconnecting member continuously interconnecting a third member of said second planetary gearset with a first member of said third planetary gearset;

a second member of said third planetary gearset being continuously connected with said transmission housing;

said output shaft being continuously connected with at least one member of one, of said planetary gearsets; said input shaft being interconnected with members of said planetary gearsets only through individually-operated selectively-engageable torque transmitting mechanisms;

six selectively engageable torque-transmitting mechanisms selectively interconnecting said members of said planetary gearsets with said input shaft, said output shaft, said transmission housing or other members of said planetary gearsets;

said selectively engageable torque-transmitting mechanisms being engaged in combinations of two to establish at least seven forward speed ratios and one reverse speed ratio between said input shaft and said output shaft through said planetary gearsets.

* * * * *